United States Patent
Weber et al.

(10) Patent No.: US 12,265,772 B2
(45) Date of Patent: Apr. 1, 2025

(54) INTEGRATED CIRCUIT WITH PEEK AND POKE PROTECTION CIRCUITRY FOR MULTI-TENANT USAGE MODEL

(71) Applicant: Intel Corporation, Santa Clara, CA (US)

(72) Inventors: Scott Weber, Piedmont, CA (US); Sean R. Atsatt, Santa Cruz, CA (US); David Goldman, Bala Cynwyd, PA (US)

(73) Assignee: Altera Corporation, San Jose, CA (US)

( * ) Notice: Subject to any disclaimer, the term of this patent is extended or adjusted under 35 U.S.C. 154(b) by 270 days.

(21) Appl. No.: 17/850,560

(22) Filed: Jun. 27, 2022

(65) Prior Publication Data

US 2022/0327271 A1    Oct. 13, 2022

Related U.S. Application Data

(62) Division of application No. 15/719,413, filed on Sep. 28, 2017, now Pat. No. 11,379,645.

(51) Int. Cl.
  *G06F 30/34*    (2020.01)
  *G06F 111/04*   (2020.01)

(52) U.S. Cl.
  CPC .......... *G06F 30/34* (2020.01); *G06F 2111/04* (2020.01)

(58) Field of Classification Search
  CPC .. G06F 12/1408; G06F 13/1663; G06F 21/53; G06F 21/6218; G06F 2212/1052; G06F 2221/033; G06F 16/951; G06F 21/64; G06F 21/78; G06F 9/45558; G06F 11/3495; G06F 2221/2105; G06F 9/547; G06F 2009/45587; G06F 2009/45591; G06F 2111/04; G06F 30/34; G06F 9/505; G06F 9/5061; G06F 9/5072; G06F 11/302; G06F 11/3409; G06F 11/3419; G06F 11/3442; G06F 12/1036; G06F 12/1063; G06F 15/7867; G06F 16/122; G06F 16/137; G06F 16/162; G06F 16/17; G06F 16/173; G06F 16/174; G06F 16/1744; G06F 16/1748; G06F 16/21; G06F 16/2322;

(Continued)

(56) References Cited

U.S. PATENT DOCUMENTS 6,851,062 B2   2/2005   Hartman
8,390,325 B2   3/2013   Box
(Continued)

*Primary Examiner* — Binh C Tat
(74) *Attorney, Agent, or Firm* — Fletcher Yoder, P.C.

(57) ABSTRACT

Methods and apparatus for extracting a setting of configuration bits to create an exclusion configuration for providing protection against peek and poke attacks in a multi-tenant usage model of a configurable device is provided. The device may host multiple parties that do not trust each other. Peek and poke attacks are orchestrated by tapping (peeking) and driving (poking) wires associated with other parties. Such attacks may be disabled by excluding the settings of configuration bits that would allow these attacks by other parties. This set of configuration bits that should be excluded for preventing all peek and poke attacks creates the exclusion configuration. Methods are described that disable a particular class of peek and/or poke attacks through the use of partial reconfiguration. Methods and apparatus are described to dynamically detect peek and/or poke attacks.

20 Claims, 28 Drawing Sheets

(58) Field of Classification Search
CPC .............. G06F 16/235; G06F 16/2365; G06F 16/24578; G06F 16/248; G06F 16/285; G06F 16/288; G06F 16/29; G06F 16/9535; G06F 16/958; G06F 2009/4557; G06F 2009/45583; G06F 2009/45595; G06F 21/54; G06F 21/552; G06F 21/556; G06F 21/56; G06F 21/566; G06F 21/604; G06F 21/71; G06F 21/79; G06F 2201/865; G06F 2201/88; G06F 2209/502; G06F 2209/521; G06F 2212/1016; G06F 2212/151; G06F 2212/657; G06F 2221/2101; G06F 2221/2111; G06F 2221/2115; G06F 2221/2145; G06F 3/0482; G06F 3/04842; G06F 3/04847; G06F 9/3004; G06F 9/30047; G06F 9/5038; G06F 9/5077; G06F 9/52; G06F 9/522; G06F 9/542; G06F 1/206; G06F 11/2094; G06F 11/263; G06F 11/3006; G06F 12/1466; G06F 12/1475; G06F 13/4027; G06F 16/9538; G06F 16/955; G06F 16/9566; G06F 16/9574; G06F 16/9577; G06F 18/213; G06F 2009/45579; G06F 21/52; G06F 21/567; G06F 21/57; G06F 21/602; G06F 2209/5021; G06F 2221/034; G06F 8/60; G06F 8/65; G06F 8/71; G06F 9/30003; G06F 9/30101; G06F 9/3013; G06F 9/3016; G06F 9/35; G06F 9/44505; G06F 9/455; G06F 9/4881; G06F 9/5094; G06F 9/541; G06F 9/546; G06F 18/21; G06F 17/18; G06F 16/214; G06F 9/4812; G06F 9/4493; G06F 8/427; G06F 16/25; G06F 18/217; G06F 2218/00; H04L 67/12; H04L 41/22; H04L 41/28; H04L 9/0643
USPC .................................................. 716/100–108
See application file for complete search history.

(56) References Cited

U.S. PATENT DOCUMENTS

| | | |
|---|---|---|
| 9,548,991 B1 | 1/2017 | Holden |
| 9,705,873 B2 | 7/2017 | Bishop |
| 10,235,485 B1 | 3/2019 | Iyer |
| 2012/0126850 A1 | 5/2012 | Wasson |
| 2012/0166818 A1* | 6/2012 | Orsini ................... H04L 9/3247 |
| | | 713/193 |
| 2013/0254872 A1 | 9/2013 | Lawson |
| 2015/0195303 A1 | 7/2015 | Holden |
| 2017/0257384 A1 | 9/2017 | Nadeau |
| 2019/0129867 A1* | 5/2019 | Zhang ..................... G06F 21/78 |

* cited by examiner

Mask $A_0$ = | 1 | 2 | 3 | 4 | 5 | 6 | 7 | 8 | 9 | 10 | 11 | 12 |
∩
CRAM* = | 1 | 2 | 3 | 4 | 5 | 6 | 7 | 8 | 9 | 10 | 11 | 12 |
=
Mask $B_0$ = | 1 | 2 | 3 | 4 | 5 | 6 | 7 | 8 | 9 | 10 | 11 | 12 |

Mask$C_0$ = | 1 | 2 | 3 | 4 | 5 | 6 | 7 | 8 | 9 | 10 | 11 | 12 |

Mask $A_1$ = | 1 | 2 | 3 | 4 | 5 | 6 | 7 | 8 | 9 | 10 | 11 | 12 |
∩
CRAM* = | 1 | 2 | 3 | 4 | 5 | 6 | 7 | 8 | 9 | 10 | 11 | 12 |
=
Mask $B_1$ = | 1 | 2 | 3 | 4 | 5 | 6 | 7 | 8 | 9 | 10 | 11 | 12 |

Mask$C_0$ = | 1 | 2 | 3 | 4 | 5 | 6 | 7 | 8 | 9 | 10 | 11 | 12 |
∩
Mask $B_1$ = | 1 | 2 | 3 | 4 | 5 | 6 | 7 | 8 | 9 | 10 | 11 | 12 |
=
| 1 | 2 | 3 | 4 | 5 | 6 | 7 | 8 | 9 | 10 | 11 | 12 |

The path is not continued so
parasitic loading is detected

FIG. 9E

Mask $A_0$ = | 1 | 2 | 3 | 4 | 5 | 6 | 7 | 8 | 9 | 10 | 11 | 12 |

CRAM* = | 1 | 2 | 3 | 4 | 5 | 6 | 7 | 8 | 9 | 10 | 11 | 12 |

Mask $B_0$ = | 1 | 2 | 3 | 4 | 5 | 6 | 7 | 8 | 9 | 10 | 11 | 12 |

Mask $C_0$ = | 1 | 2 | 3 | 4 | 5 | 6 | 7 | 8 | 9 | 10 | 11 | 12 |

Mask $A_1$ = | 1 | 2 | 3 | 4 | 5 | 6 | 7 | 8 | 9 | 10 | 11 | 12 |

CRAM* = | 1 | 2 | 3 | 4 | 5 | 6 | 7 | 8 | 9 | 10 | 11 | 12 |

Mask $B_1$ = | 1 | 2 | 3 | 4 | 5 | 6 | 7 | 8 | 9 | 10 | 11 | 12 |

Mask B1 has 2 bits set so the configuration is flagged as illegal since it is creating contention.

FIG. 9G

Persona = | 1 | 2 | 3 | 4 | 5 | 6 | 7 | 8 | 9 | 10 | 11 | 12 |
∩
Solution' (5) = | 1 | 2 | 3 | 4 | 5 | 6 | 7 | 8 | 9 | 10 | 11 | 12 |
=
Check = | 1 | 2 | 3 | 4 | 5 | 6 | 7 | 8 | 9 | 10 | 11 | 12 |

FIG. 12A

Persona = | 1 | 2 | 3 | 4 | 5 | 6 | 7 | 8 | 9 | 10 | 11 | 12 |
∩
Solution'' (6) = | 1 | 2 | 3 | 4 | 5 | 6 | 7 | 8 | 9 | 10 | 11 | 12 |
=
Check = | 1 | 2 | 3 | 4 | 5 | 6 | 7 | 8 | 9 | 10 | 11 | 12 |

FIG. 12B

INTEGRATED CIRCUIT WITH PEEK AND POKE PROTECTION CIRCUITRY FOR MULTI-TENANT USAGE MODEL

CROSS REFERENCE TO RELATED APPLICATIONS

This application is a Divisional of Non-Provisional application Ser. No. 15/719,413, filed Sep. 28, 2017, entitled "Integrated Circuit with Peek and Poke Protection Circuitry for a Multi-Tenant Usage Model," which are hereby incorporated by reference in their entireties for all purposes.

BACKGROUND

A programmable logic device can be configured to support a multi-tenant usage model. A multi-tenant usage model arises where a single device is provisioned by a server to support N clients. It is assumed that the clients do not trust each other, that the clients do not trust the server, and that the server does not trust the clients. The multi-tenant model is configured using a base configuration followed by an arbitrary number of partial reconfigurations (i.e., a process that changes only a subset of configuration bits while the rest of the device continues to execute).

Before configuring the device, the server and the clients agree on which compute and routing resources are owned by which party. Each configuration bit is owned by exactly one party or can be un-owned. Un-owned bits can be implicitly or explicitly assigned to a static region and have their configuration set to default. However, since none of the parties trust each other, peek and poke attacks can be inadvertently or intentionally orchestrated by tapping ("peeking") or driving ("poking") wires or resources belonging to another party. Such peeking and poking among the different parties is generally undesirable.

It is within this context that the embodiments described herein arise.

BRIEF DESCRIPTION OF THE DRAWINGS

FIGS. 9D and 9E are diagrams illustrating how parasitic loading can be dynamically detected in accordance with an embodiment.

FIGS. 9F and 9G are diagrams illustrating how contention can be dynamically detected in accordance with an embodiment.

FIGS. 12A and 12B are diagrams illustrating how a private persona can be checked against a promise-not-to-peek solution in accordance with an embodiment.

DETAILED DESCRIPTION

Embodiments of the present invention relate to methods and apparatus for extracting a setting of configuration bits to create an exclusion configuration, which provides protection against peek and poke attacks in a multi-tenant usage model of a programmable integrated circuit. A multi-tenant usage model includes multiple clients and a server (e.g., a host) that do not trust one another.

Peek and poke attacks may be disabled by excluding the settings of configuration bits that would allow these attacks by the clients or the server. The set of configuration bits and the setting of these bits that prevent all peek and poke attacks form the exclusion configuration. Disabling of peek/poke attacks may be implemented statically via partial reconfiguration or dynamically during normal operation of the integrated circuit.

It will be recognized by one skilled in the art, that the present exemplary embodiments may be practiced without some or all of these specific details. In other instances, well-known operations have not been described in detail in order not to unnecessarily obscure the present embodiments.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data is sometimes referred to as "partial reconfiguration" (e.g., it may sometimes be advantageous to reconfigure only a portion of the configuration bits using a process known as partial reconfiguration). During partial reconfiguration, new data should be written into a selected portion of memory elements (sometimes referred to as "memory cells").

Figure 1:
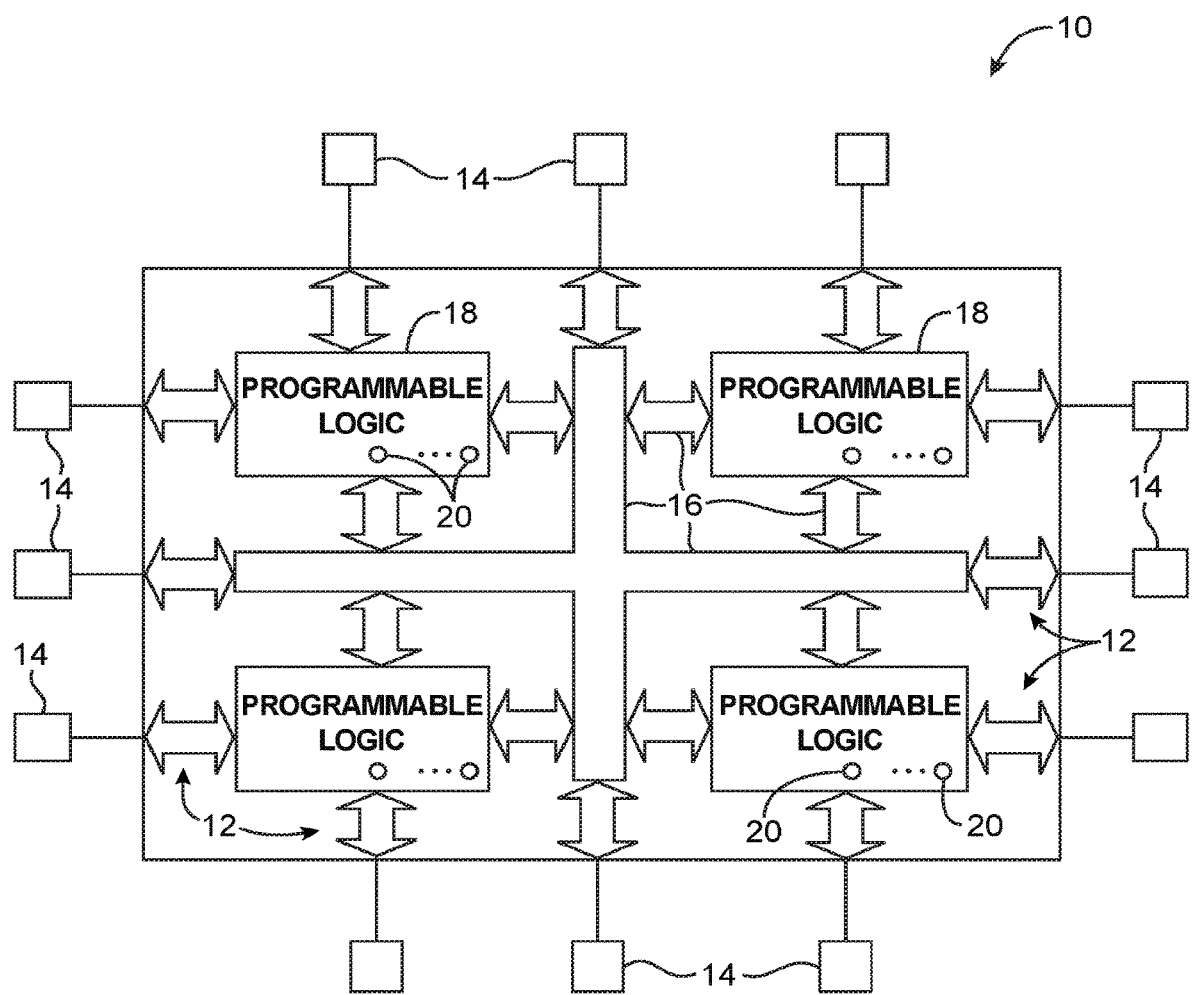
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10.

Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
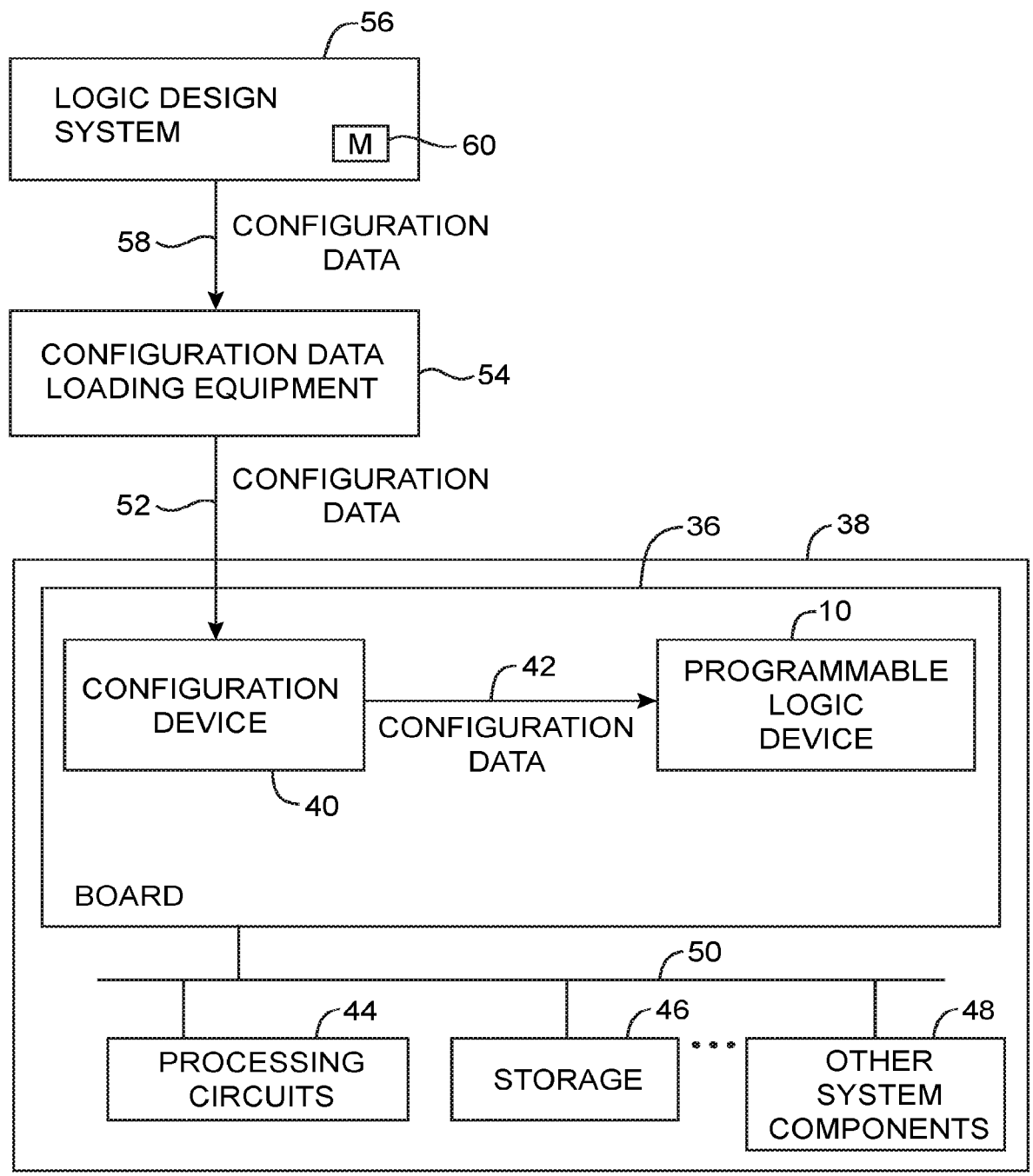
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

It can be a significant undertaking to design and implement a desired (custom) logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
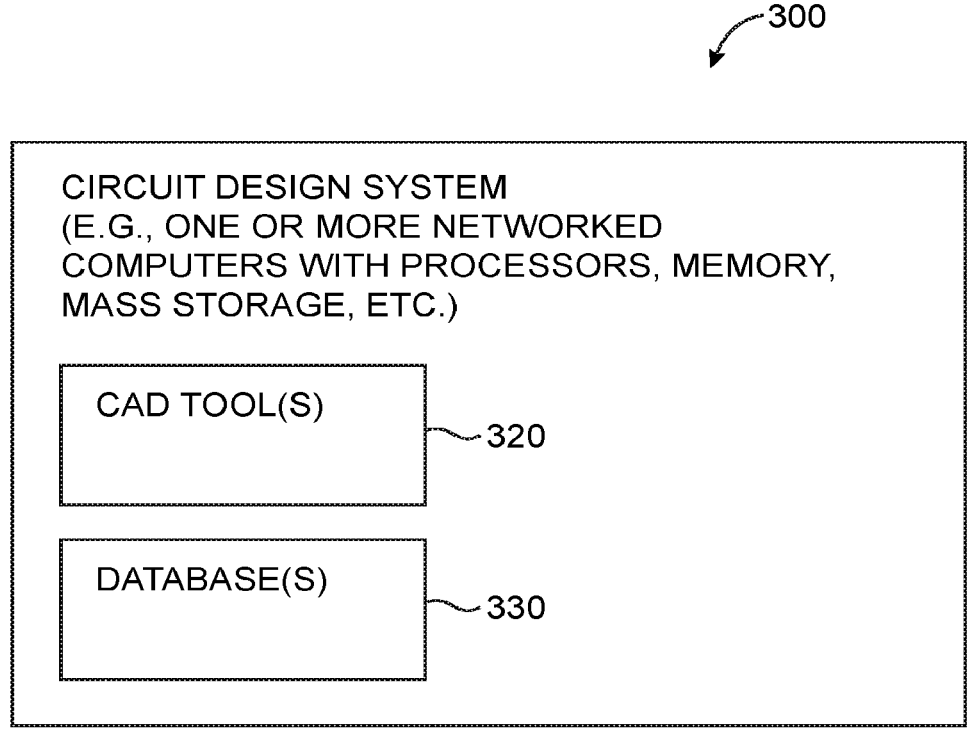
FIG. 3 is a diagram of a circuit design system that may be used to design integrated circuits in accordance with an embodiment.

An illustrative circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
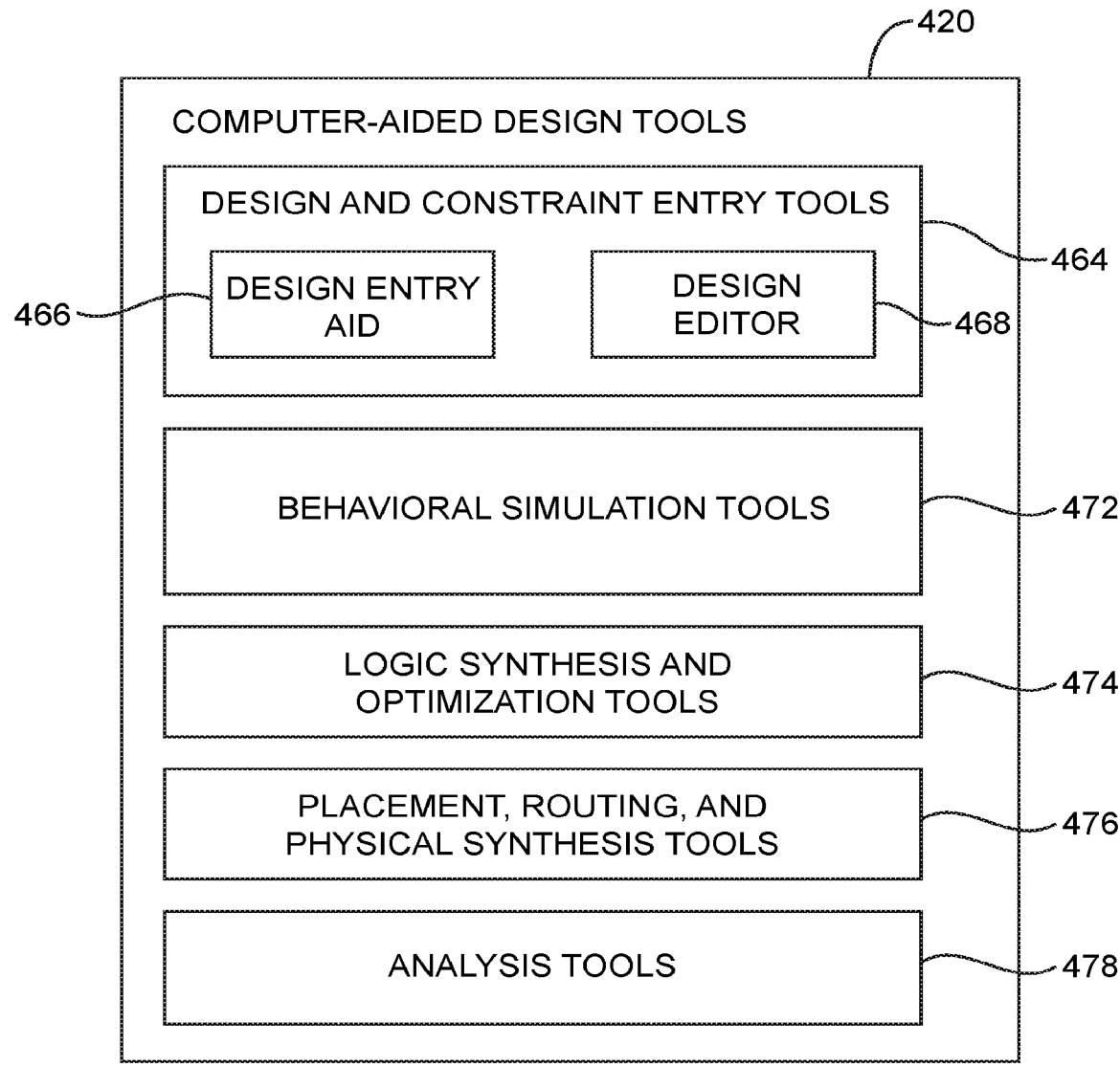
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
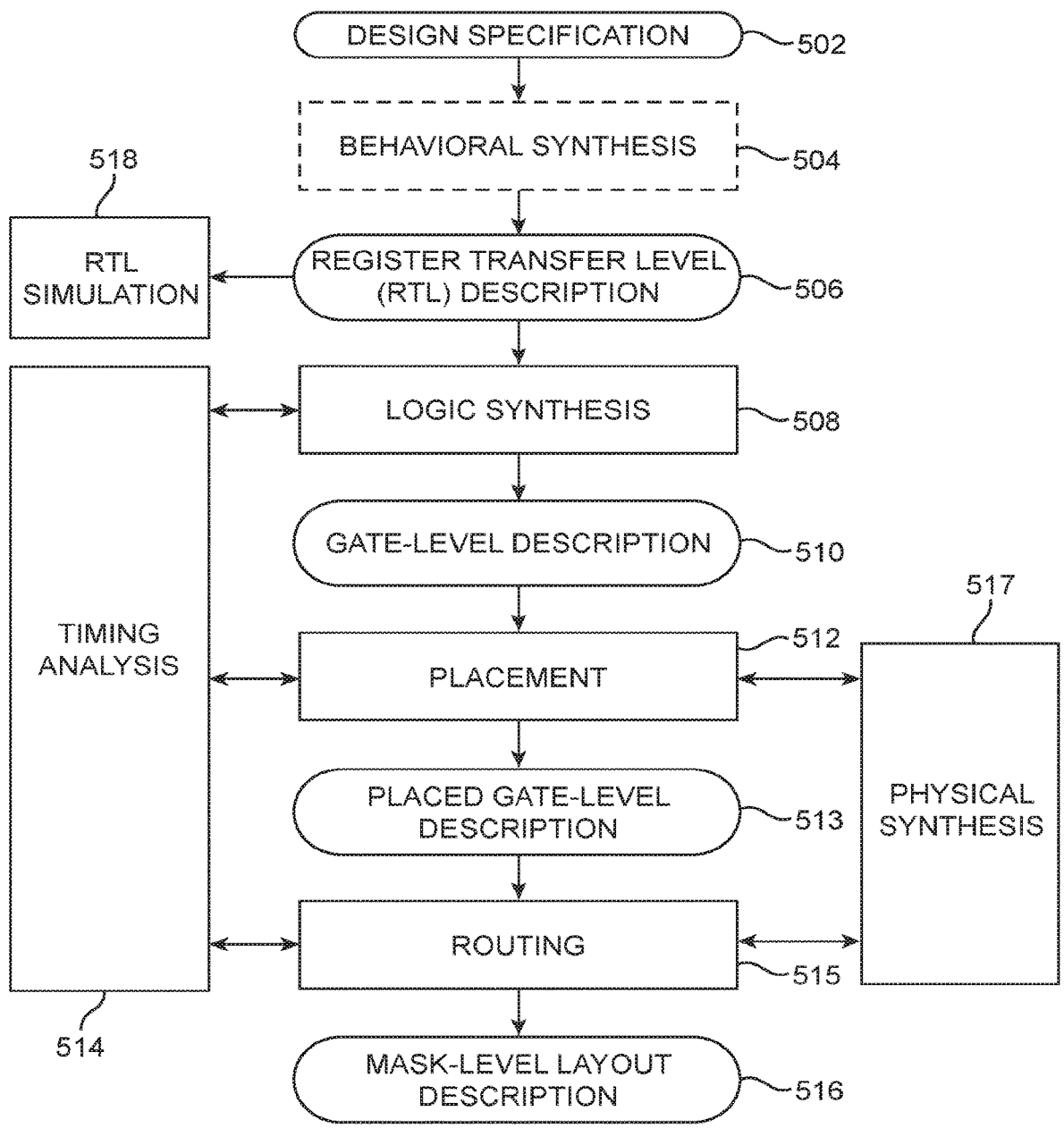
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a mask-level layout description 516 (sometimes referred to as routed gate-level description 516). The mask-level layout description 516 generated by the design flow of FIG. 5 may sometimes be referred to as a device configuration bit stream or a device configuration image.

While placement and routing is being performed at steps 512 and 515, physical synthesis operations 517 may be concurrently performed to further modify and optimize the circuit design (e.g., using physical synthesis tools 476 of FIG. 4).

Programmable integrated circuit device 10 may be configured using tools described in FIGS. 2-5 to support a multi-tenant usage model or scenario. A multi-tenant usage model is assumed where a single device is provisioned by a server to support N clients, where N is at least equal to 1. It is also assumed that the clients do not trust each other, that the clients do not trust the server, and that the server does not trust the clients. The multi-tenant model is configured using a base configuration followed by an arbitrary number of partial reconfigurations.

All N+1 parties involved need protection from peek and poke attacks which can be orchestrated by the base configuration, subsequent partial reconfigurations, or physical tampering. Before configuring the device, the server and N clients agree on which compute and routing resources they own as defined by which configuration bits are owned by the server and the N clients. Each configuration bit is owned by exactly one party, either the server or one of the N clients. Furthermore, all configuration bits are owned by some party. In some embodiments, this provisioning of the configuration bits to the server and the N clients is performed through the use of a trusted compilation flow. To change the provisioning in this embodiment, the trusted flow can be recompiled to redo the entire configuration of the device.

Figure 6A:
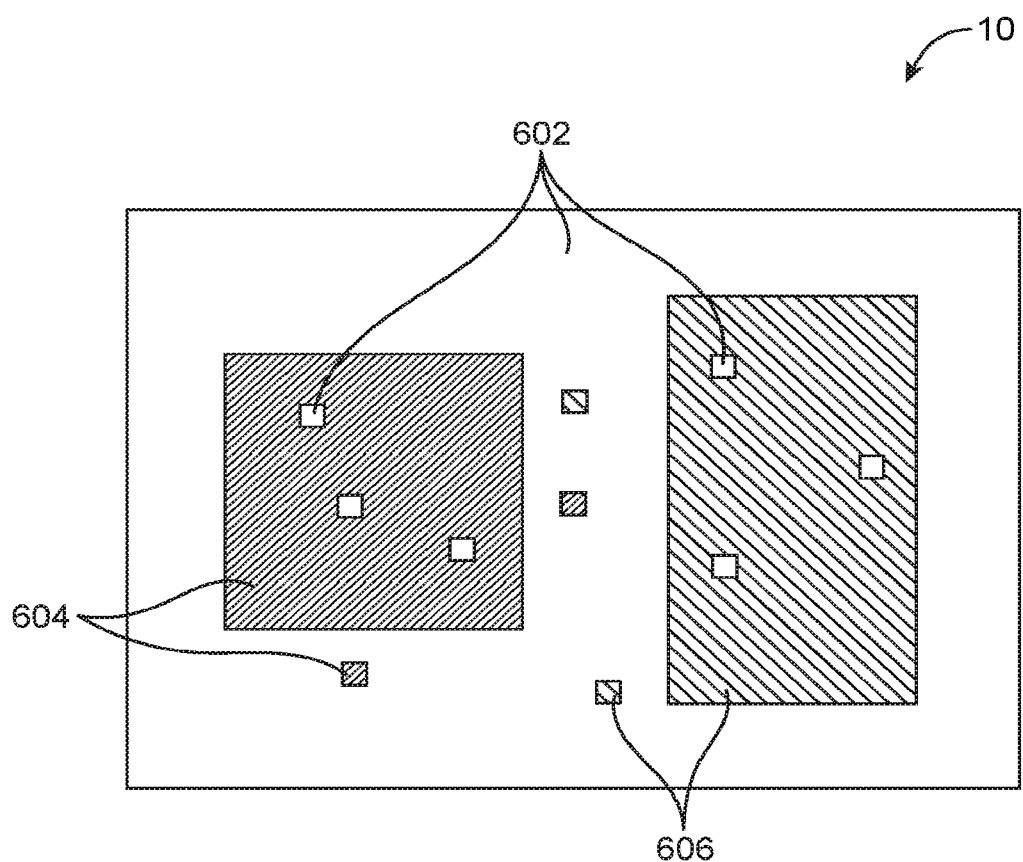
FIG. 6A is a diagram of an illustrative spatial provisioning of configuration bits on a programmable integrated circuit in accordance with an embodiment.

Each configuration bit has a specific spatial location. FIG. 6A is a diagram of an illustrative spatial provisioning of configuration bits for three parties on programmable device 10 (see, e.g., regions 602 associated with a first party, regions 604 associated with a second party, and regions 606 associated with a third party). Without loss of generality, it is assumed that region 602 is a static region, whereas regions 604 and 606 are partial reconfiguration (PR) regions. A static region is a region where the N+1 parties agree that the configuration bits cannot be changed by partial reconfiguration. N is equal to two in this example of FIG. 6A. Typically, the static region is owned by the server/host, but in general, the distinction between client and server is not required. The distinction of a region being a static or partial reconfiguration region is what matters.

The configuration bit provisioning is done such that the set of configuration bits associated with the control of an intellectual property (IP) block is owned by a single party. For compute elements and memory IP blocks, the ownership sets of configuration bits are organized such that the configuration bits that control the communication to and from the IP blocks are separated from the configuration bits that control the function of the compute element or memory IP blocks. The communication between the IPs is controlled through the configuration of routing multiplexers, and the configuration bits for a routing multiplexer is owned by a single party.

To build a design, the compute elements and memory create communication channels using the routing multiplexers. For this disclosure, it is assumed that the provisioning of configuration bit sets for compute elements, memory, and routing IP is done in a non-malicious manner so that the partial reconfiguration region and static region owners are capable of creating a functioning design that they fully control, including how it interfaces with the other partial reconfiguration regions and/or static region.

The ability for a region to peek on and/or poke at a region that is not by owned by them stems from the fact that configurable devices have a vast network of routing and a routing multiplexers owned by one region that could be configured to attach to a wire being driven by another region. With the ownership model described, this configuration would not be considered illegal and would allow the owning region to snoop on the other region and/or create parasitic loading to disrupt the function of the non-owning region.

If the region with the driver was the one creating this malicious connection, it could corrupt the receiving region by putting multiple drivers on a routing multiplexer. This configuration would be considered illegal with the ownership model described. However, the problem is symmetrical so it is also addressed in this disclosure and could occur if a party was compromised and was able to violate the ownership of configuration bits.

To facilitate "peek" attacks, the base configuration of the static and partial reconfiguration regions or a subsequent partial reconfiguration of a partial reconfiguration region would have to configure their owned routing multiplexers to snoop on another region. To prevent this, an exclusion region configuration is extracted based on the provisioning of the configuration bits to the parties involved. This exclusion region configuration also defends against the symmetrical poke attacks. In other words, an exclusion region defines bits that (when cleared) stop peek/poke attacks. In some embodiments, applying this exclusion region configuration through the use of partial reconfiguration disables peek and poke attacks. In some embodiments, dynamic checks against the exclusion region configuration are applied to avoid and detect peek and poke attacks.

After a trusted compilation flow has done a complete provisioning of all configuration bits to the involved parties and after every configuration bit is owned by a partial reconfiguration region or the static region, analysis on the routing occurs to create the exclusion region configuration. The trusted compilation flow has the ability to analyze where there are peek and poke possibilities based on the physical routing and configuration resources. The trusted compilation flow may be performed using tools 420 during any of steps 502-517 shown in FIGS. 4 and 5.

Figure 6B:
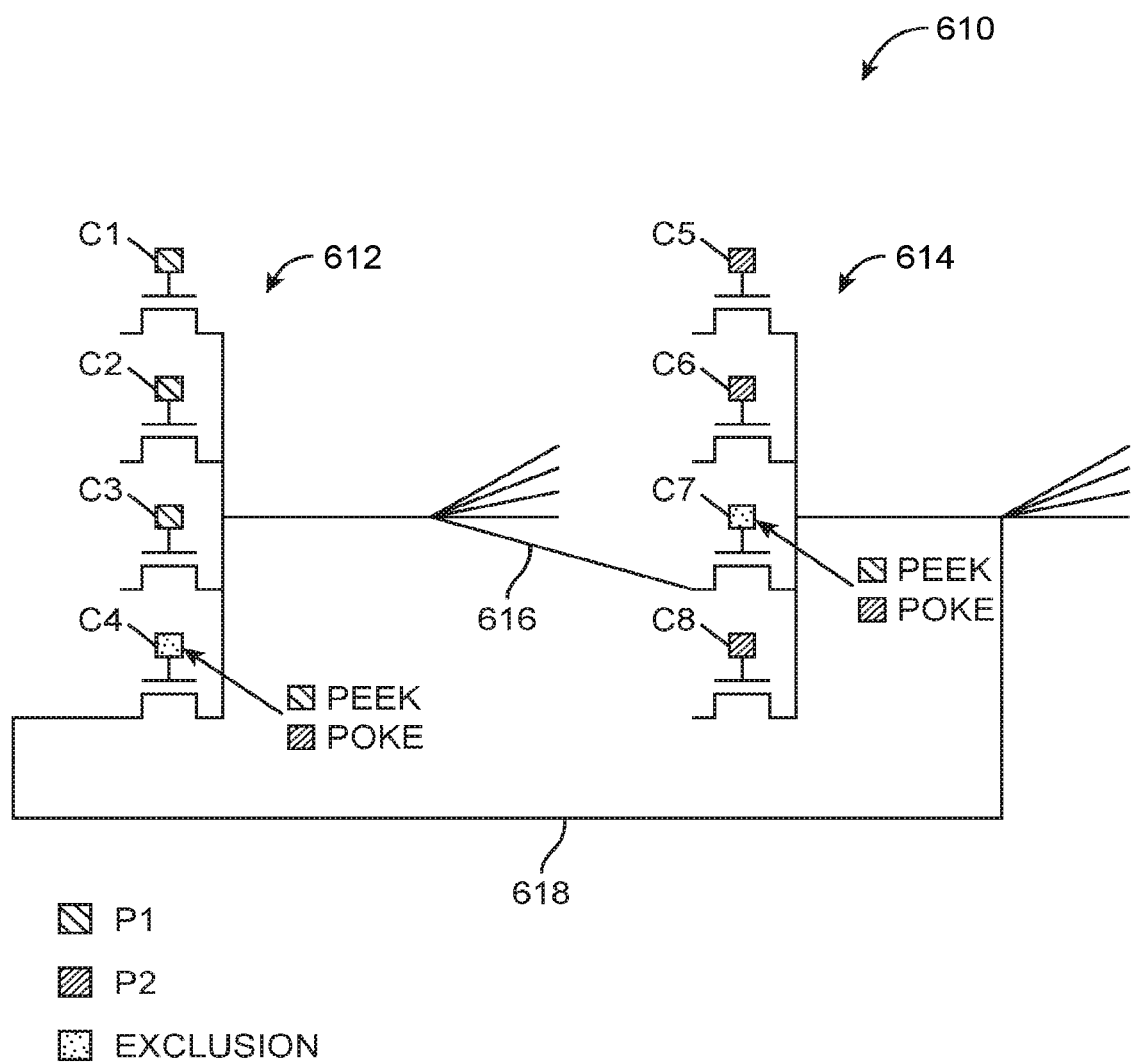
FIG. 6B is a diagram illustrating peek/poke identification and exclusion region creation in accordance with an embodiment.

In some embodiment, the routing multiplexers are implemented in an n-channel pass-gate implementation as shown in FIG. 6B. Multiplexing circuit 610 may include a first pass-gate routing multiplexer 612 coupled to a second pass-gate routing multiplexer 614. As shown in FIG. 6B, the first pass-gate routing multiplexer 612 is assumed to be owned by a first partial reconfiguration region associated with a first party P1, and the second pass-gate routing multiplexer 614 is assumed to be owned by a second partial reconfiguration region associated with a second party P2. The boxes at the gates of the pass-gate transistors are the configuration bits and are shaded to show ownership. Configuration bits C1-C3 are owned by P1, whereas configuration bits C5, C6, and C8 are owned by P2. Configuration bits C4 and C7 are in the exclusion region.

For first routing multiplexer 612, allowing P1 to set bit C4 that is owned by the exclusion region would result in P1 being able to peek on P2 (since multiplexer 612 would be able to select path 618 from the output of multiplexer 614). Conversely, allowing P2 to set bit C4 that is owned by the exclusion region would result in P2 being able to poke P1's region (since P2 can now inject an unknown value into multiplexer 612 using path 618).

Similarly, for second routing multiplexer 614, allowing P1 to set bit C7 that is owned by the exclusion region would result in P1 being able to poke P2's region (since P1 can now inject an unknown value into multiplexer 614 using path 616). Conversely, allowing P2 to set bit C7 that is owned by the exclusion region would result in P2 being able to peek P1's on region (since multiplexer 614 would be able to select path 616 from the output of multiplexer 612).

The exclusion region configuration in this scenario would be to configure the two exclusion bits to be equal to zero (e.g., to set C4 and C7 to logic "0"), thereby preventing any potential peek/poke attack between P1 and P2. Thus, the exclusion region may generally be defined as a set of configuration bits that is set to zero to prevent any malicious peek/poke attacks among different parties in a multi-tenant usage scenario on device 10.

Figure 6C:
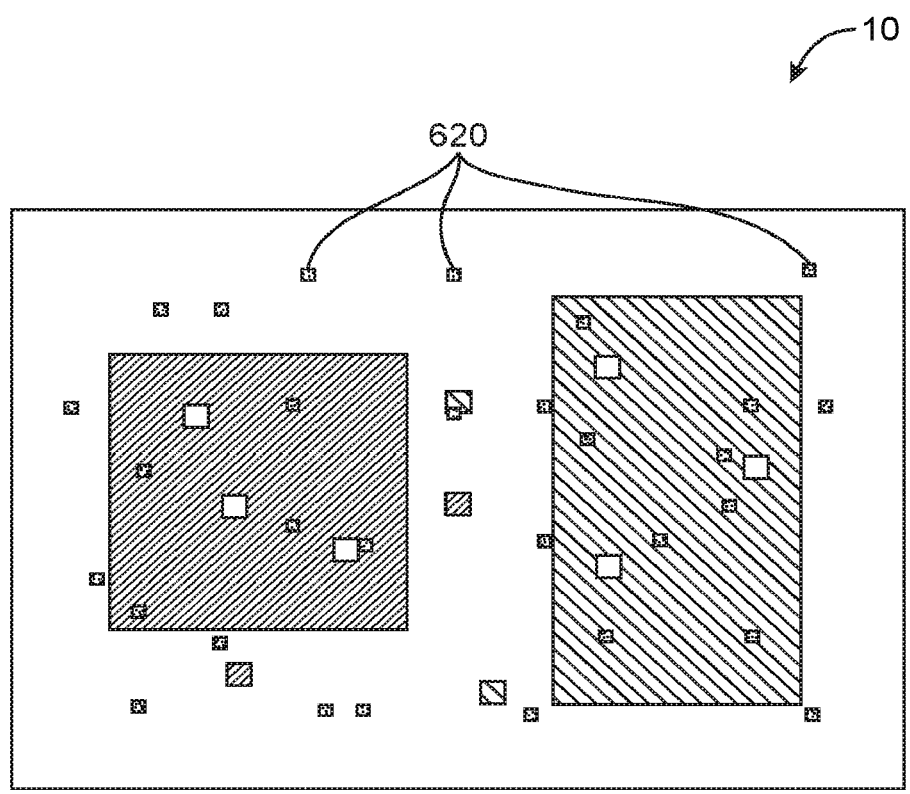
FIG. 6C is a diagram of an illustrative spatial provisioning of configuration bits with exclusion regions in accordance with an embodiment.

An example of the exclusion region configuration over the original provisioning of configuration bits for the static and PR regions shown in FIG. 6A is shown in FIG. 6C. The exclusion regions 620 are shown in white for clarity, which effectively creates a fourth party in the multi-tenant system. The bits of the exclusion region are not owned by any of the other parties, so these regions 620 should not be capable of creating a peek or poke attacks by definition.

If, however, one of the parties compromises the trusted compilation flow to create a malicious configuration or if there is a physical attack such as a focused ion beam attack or other physical tampering, then the exclusion region configuration could be compromised. As long as the exclusion region configuration bit stream has not been compromised itself, it can be re-applied through partial reconfiguration to re-establish isolation. Since the exclusion region configuration only disables inputs on routing multiplexers, it is safe to use a partial reconfiguration to apply the exclusion configuration without affecting the execution of the other regions. The application of the exclusion region configuration simply breaks illegal routing connections.

The implementation of the routing multiplexers shown in FIG. 6B shows one possible implementation which uses a one-hot encoding for the routing multiplexers' control. In other embodiments, the routing multiplexers may use different encodings where configuration bits can be shared. When there are shared configuration bits, it is no longer possible to simply check if a bit is set. Instead, the actual values of the configuration bits matter. In some embodiments, shared configuration bits are handled by disabling routes as shown in FIG. 6D.

Figure 6D:
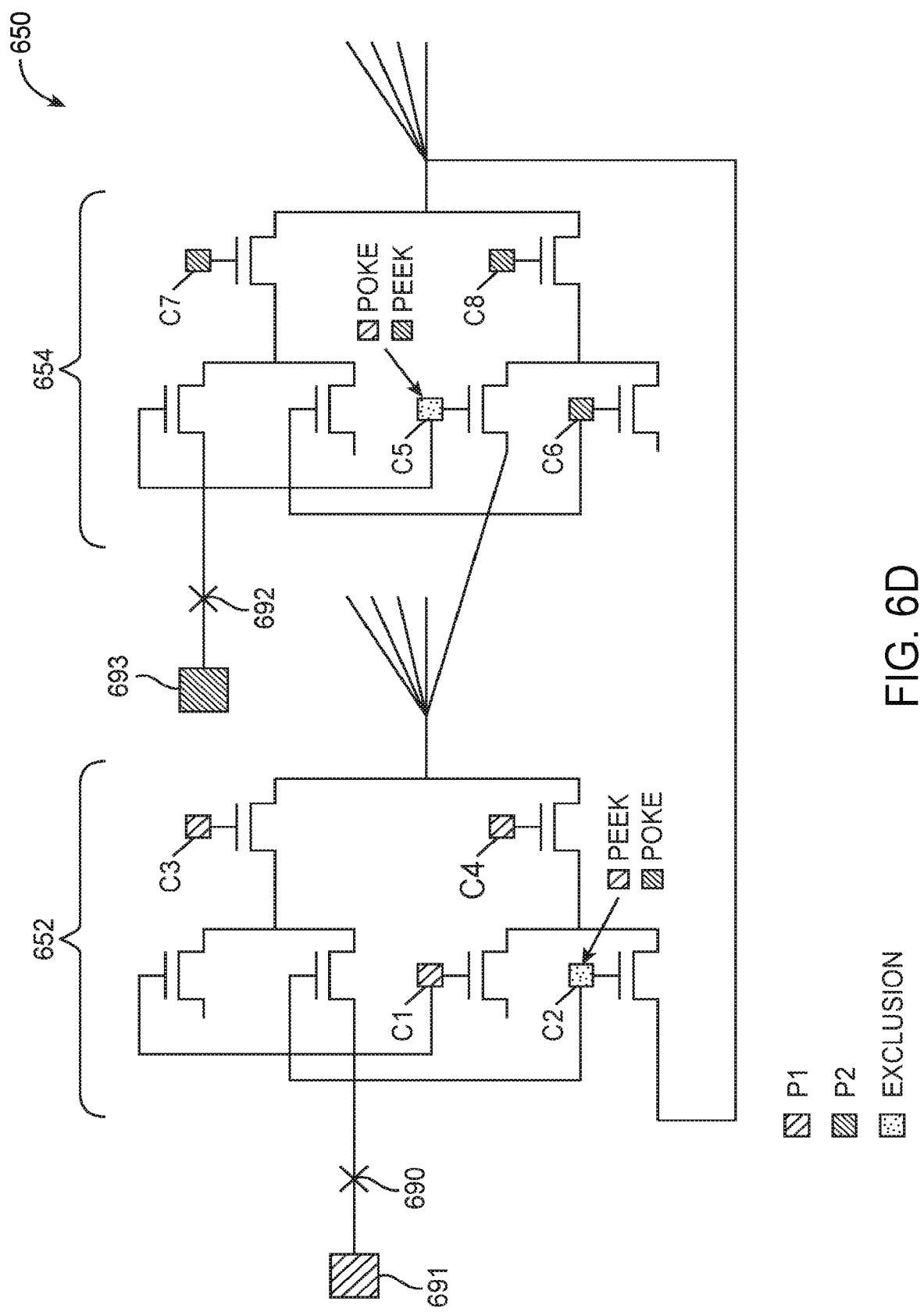
FIG. 6D is a diagram illustrating exclusion bits in a shared configuration bit arrangement in accordance with an embodiment.

The routing multiplexers in circuitry 650 of FIG. 6D are two-stage versions of the routing multiplexers in circuitry 610 shown in FIG. 6B, where the multiplexers in circuitry 650 use shared configuration bits. In the example of FIG. 6D, party P1 owns configuration bits C1, C3, and C4, whereas party P2 owns configuration bits C6-C8. Configuration bits C2 and C5 are in the exclusion region. If P1 were able to set the exclusion bit C2 and if bit C4 is also set, then P1 peeks on P2. If P2 were able to set exclusion bit C2 and if bit C4 is also set, then P2 pokes P1. Similarly, if P1 were able to set exclusion bit C5 and if bit C8 is also set, then P1 pokes P2. If P2 were able to set exclusion bit C5 and if bit C8 is also set, then P2 peeks on P1.

To maintain the model of checking if a bit of the exclusion region is set, the exclusion configuration bits C2 and C5 are disallowed to be set (e.g., bits C2 and C5 are both zero). As a result, routing paths 690 and 692 (which feed into pass gates controlled by the exclusion bits) are not available even though they are being driven by appropriately owned drivers 691 and 693, respectively. In this arrangement, the ownership of bits follows the model where a configuration bit is still owned by exactly one region as shown in FIG. 6C, and isolation is re-established by performing partial reconfiguration using the exclusion region configuration (e.g., by setting any shared exclusion bits to zero).

In some embodiments, to avoid the reduction in routing demonstrated in the example shown in FIG. 6D, the configuration bit values are checked to see if they violate the exclusion region configuration. This enhancement results in no loss of routability, but requires a more sophisticated checker to solve a set of constraints to find the exclusion region configuration.

For example, consider a scenario in which bits C2 and C4 in FIG. 6D both belong to P1 and the exclusion region. This is because route 690 is allowed, which requires that configuration bits C2 and C3 be set. Unless otherwise indicated, the verb "set" is used to refer to setting a configuration bit to logic "1." However, it is disallowed for configurations bits C2 and C4 to be set simultaneously as that allows a peek attack by P1 or poke attack by P2.

Likewise, the configuration bits C5 and C8 may both belong to P2 and the exclusion region. This is because route 692 is allowed, which requires that the configuration bits C5 and C7 be set (e.g., driven high to logic "1"). However, it is disallowed for configuration bits items C5 and C8 to be set simultaneously as that allows a peek attack by P2 or poke attack by P1.

In such scenarios, there is not a unique ownership of configuration bits, so the previous techniques of applying the exclusion region configuration through a partial reconfiguration no longer works to provide isolation, but instead would break designs.

In accordance with an embodiment, the following dynamic check is constructed. First, a mask of all first-level configuration bits that would allow a peek attack by another partial reconfiguration region (i.e., by another party) is created. This mask is called "MaskA". Second, a mask of all second-level configuration bits that, when set, could create a peek attack by another partial reconfiguration region (i.e., by another party) is created if a corresponding first-level configuration bit were also set. This mask is called "MaskB". The calculation of "MaskA" and "MaskB" do not have to be secure and can be computed offline (e.g., MaskA and MaskB may be computed separately and published on device 10).

With these two global publicly available masks, the following dynamic check occurs. A "MaskC" is created as follows:

$$MaskC = (CRAM^*) \text{ AND} (MaskA) \tag{1}$$

where CRAM* represents the current on-chip configuration setting. This calculates the set of all first-level configuration bits in MaskA that are set. The calculation of MaskC should occur in a secure manner since exposing the plaintext configuration state of the device compromises security.

After securely calculating MaskC, "MaskD" may be generated by setting all second-level bits that would continue routing of a set bit in MaskC (e.g., if a bit is set in MaskC, then set all second level bits in MaskD that would continue that route). A bit set in MaskD indicates that setting this bit will continue a malicious peek route from the first-level. Since MaskC cannot be exposed for security reasons, the calculation of MaskD has to also be computed in a secure manner.

After securely calculating MaskD, "MaskE" is calculated as follows:

$$MaskE = (MaskD) \text{ AND} (MaskB) \quad (2)$$

A bit set in MaskE indicates the point of the malicious peek. Since MaskD cannot be exposed for security reasons, the calculation of MaskE has to also be computed in a secure manner.

Figure 7A:
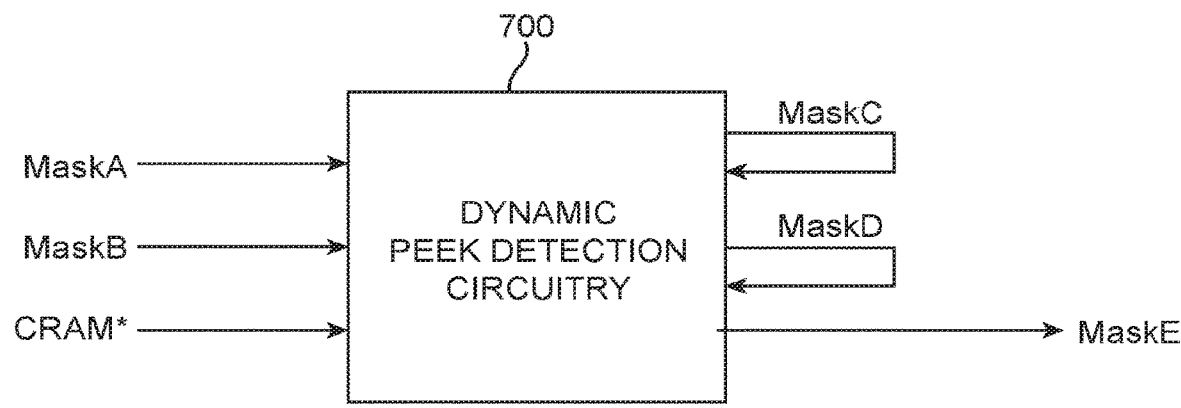
FIG. 7A is a diagram of illustrative dynamic peek detection circuitry in accordance with an embodiment.

FIG. 7A is a diagram of illustrative dynamic peek detection circuitry 700 that can be used to compute MaskA-MaskE using the process described above. As shown in FIG. 7A, circuitry 700 may receive globally available information MaskA, MaskB, and CRAM* and may be configured to compute MaskC, MaskD, and MaskE using at least equations (1) and (2).

Figure 7B:
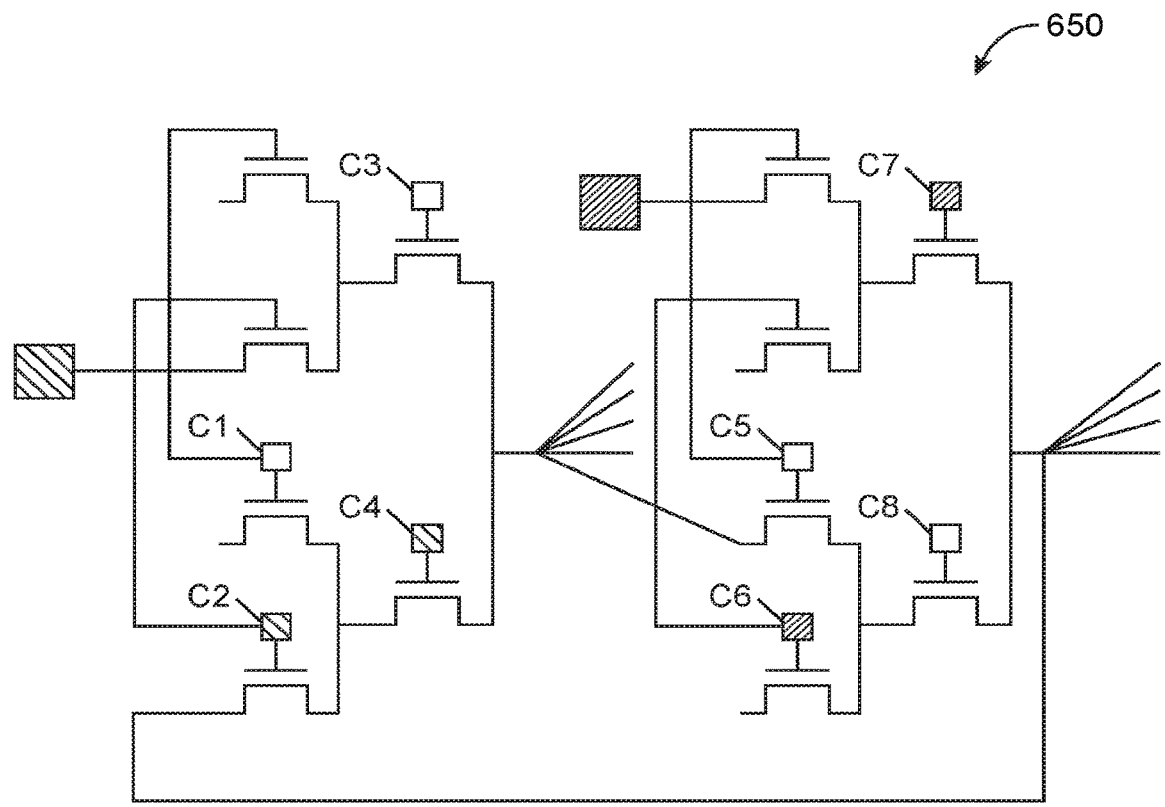
FIG. 7B is a circuit diagram of illustrative routing circuitry in accordance with an embodiment.

An example of the dynamic detection is shown in FIG. 7B. The shared configuration bits of routing multiplexer 650 shown in FIG. 6D is shown again with a particular configuration where bits C2, C4, C6, and C7 are set. In particular, bits C2 and C4 are owned by party P1, whereas bits C6 and C7 are owned by party P2.

Figures 7C, 7D, 7E, 7F:
FIGS. 7C-7F are diagrams illustrating the flow of dynamic peek detection in accordance with an embodiment.

Masks MaskA and MaskB are calculated by an analysis of the routing architecture and usage between the P1 and P2 partial reconfiguration regions. As shown in FIG. 7C, bits 2 and 5 are set in MaskA, whereas bits 4 and 8 are set in MaskB. The existing configuration of the configuration bits CRAM* is also shown in FIG. 7C (e.g., bits 2, 4, 6, and 7 are currently set).

The calculation of MaskC, MaskD, and MaskE are done in a secure manner to avoid exposing the plaintext configuration. As shown in FIG. 7D, MaskC is generated by intersecting CRAM* and MaskA, and only bit 2 overlaps in this example. As shown in FIG. 7E, MaskE only has bit 4 set, since C4 is the only bit that would continue the routing from C2. As shown in FIG. 7F, MaskE is generated by intersecting MaskD and MaskB, and only bit 4 overlaps in this example.

In other words, MaskE has indicated that bit C4 creates a peek attack. By analyzing MaskE and MaskC, it can be determined that P1 is either peeking on P2 or P2 is poking P1. As long as MaskE has any bit set high, then a peek/poke attack is detected. Ideally, MaskE should have no set bits, which indicates that there is no peek/poke attack.

The example of FIGS. 7B-7F where the mask computation is performed for multiplexer 650 with two levels is merely illustrative. In other embodiments, there may be N levels in a multiplexer, where N can be greater than two. In those embodiments, public masks are calculated for each level similarly to MaskA and MaskB as described previously for the case where N=2.

Figure 7G:
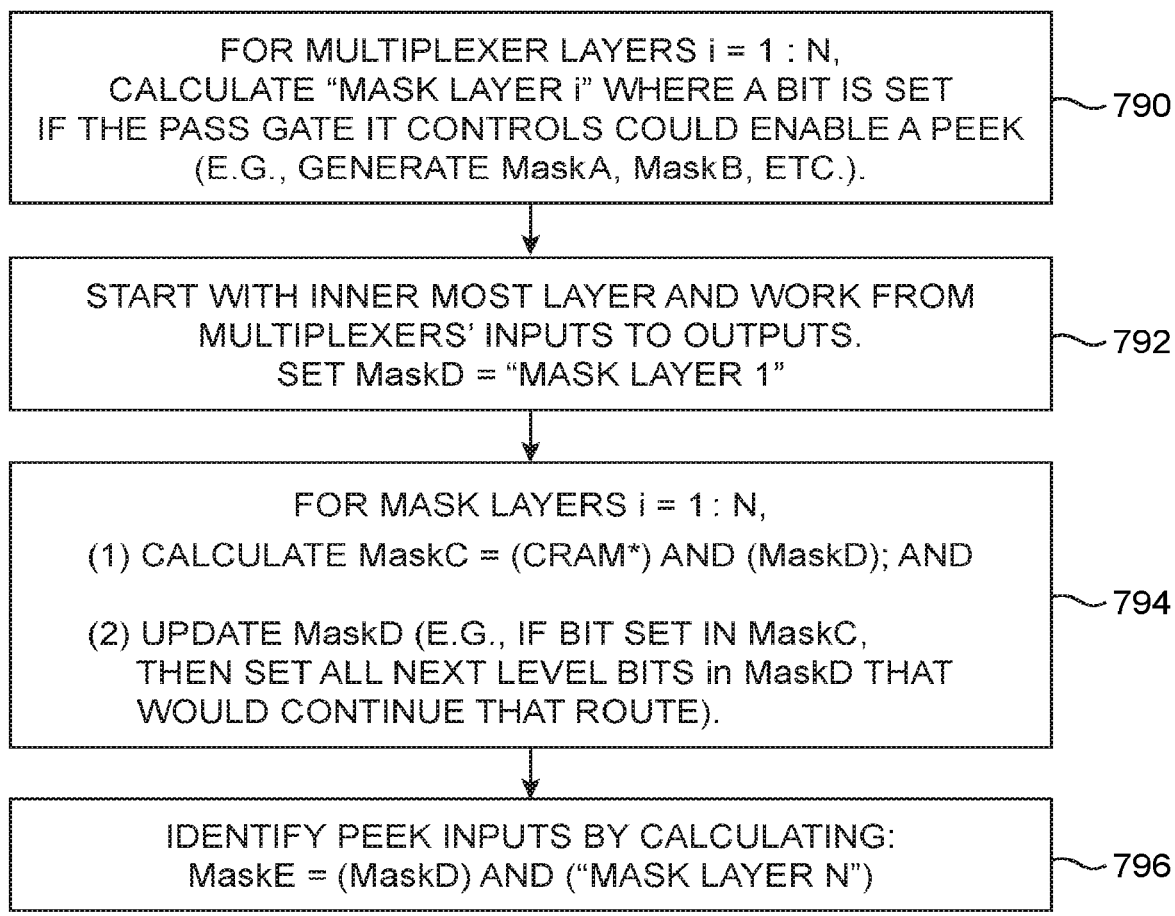
FIG. 7G is a flow chart of illustrative steps for performing dynamic peek detection in accordance with an embodiment.

FIG. 7G is a flow chart of illustrative steps for performing dynamic peek detection for a generic N-level multiplexer. At step 790, for each of multiplexer layers i equal one through N, circuitry 700 may calculate "mask layer i", where a bit is set if the pass gate it controls could enable a peek. In the example of FIGS. 7B-7F, "mask layer 1" is equal to MaskA, and "mask layer 2" is equal to MaskB.

At step 792, MaskD may be computed by starting with the inner most layer and working from the multiplexer's inputs to outputs. Therefore, at the beginning, MaskD may be initially set equal to mask layer 1.

At step 794, for each of multiplexer layers i equal to 1 through N, MaskC may be calculated by intersecting CRAM* and MaskD, and MaskD may then be updated. For example, if a bit is set in MaskC, then circuitry 700 would set all next level bits in MaskD that would continue that particular route.

At step 796, circuitry 700 may then identify any peek inputs by intersecting MaskD and "mask layer N" to generate MaskE. Any bits that are high in MaskE correspond to a bit that allows a peek/poke attack.

The calculations shown in FIG. 7G may be performed on the entire partial reconfiguration region or can be specific to a partial reconfiguration persona (e.g., to a specific party). The check can be done offline or online. The ability to perform the check online allows for the secure detection of runtime peek/poke attacks. The actual attack vector can be determined by walking the construction of MaskE and through MaskD in the same manner as was described for the example of FIG. 7B.

Figure 7H:
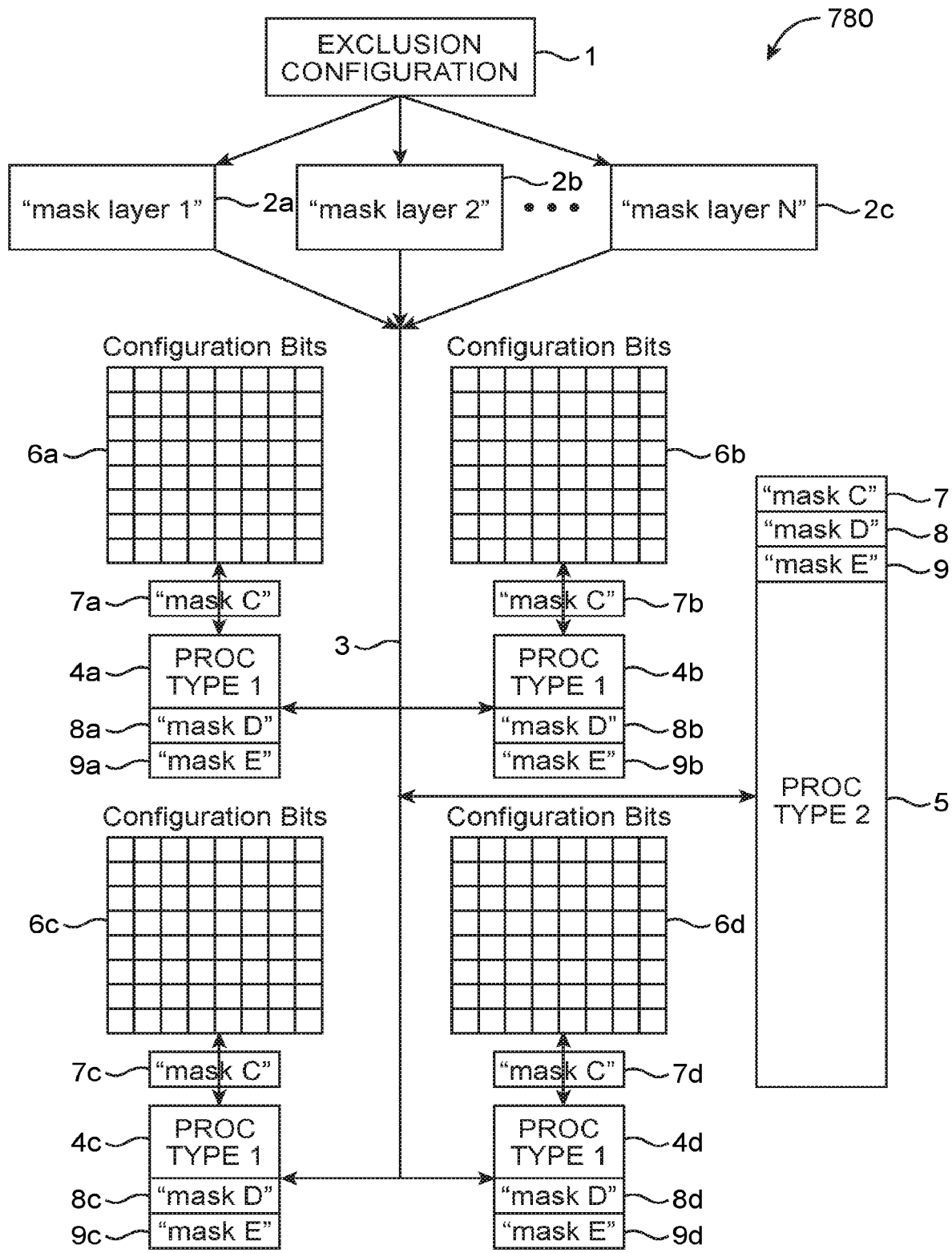
FIG. 7H is a diagram showing how dynamic peek detection can be implemented on a heterogeneous system of processors in accordance with an embodiment.

In some embodiments, a dynamic checker is implemented on a heterogeneous system 780 of processors as shown in FIG. 7H. The exclusion region configuration 1 is extracted using the analysis methods described previously in this disclosure. From the exclusion region configuration, "mask layer 1", "mask layer 2", . . . , "mask layer N" (see, e.g., items 2a-2c) are extracted as described in the dynamic peek detection process described in connection with FIG. 7A-7G. These masks are sent to a configuration network-on-chip (CNOC) 3 connected to the heterogeneous system 780. Some of these processors 4a-4d are directly connected to arrays 6a-6d of configuration bits. Another type of processor 5 may not be connected to arrays 6a-6d, but may communicate with processors 4a-4d through the CNOC.

In some embodiments, the dynamic peek detection process the "mask layer i" is partitioned to the specific processors 4a-4d that connect to the configuration bits of the partition. The calculation of MaskC, MaskD, and MaskE are then done in a partitioned manner as shown in items 7a-7d, 8a-8d, and 9a-9d, respectively. In other embodiments, the dynamic peek detection process may be implemented in a centralized manner where the calculations of MaskC, MaskD, and MaskE are done by a centralized processor 5, as shown in items 7-9.

In the case of non-shared configuration bits, we were able to specify an exclusion region to eliminate peek and poke attacks through a partial reconfiguration flow. In the case of shared-bits, we demonstrated the dynamic checker of FIG. 7G in order to ensure no loss in routability. The ability to stop peek and poke attacks for shared configuration bit scenarios using a partial reconfiguration flow by publishing information such in the form of a bit-mask is also possible. For example, each partial reconfiguration "persona" (i.e., each party such as a client or even the server) publishes a set of configurations that would stop a peek attack. This set of configurations is extracted by the trusted compiler by determining a set of configuration bits that, when cleared to zero, would stop peek attacks. In some embodiments, all configuration bits for multiplexers that have a peek potential are cleared, except for those that are used by the persona. The set to clear is made public to all parties involved so that they can check it. Alternatively, the set of clear information may be kept private to enhance security, or the information may be reduced so that only a minimal amount of information is made public. Heretofore, the bit-mask that is disclosed is referred to as a promise-not-to-peek (PNTP) solution, a PNTP bit stream, a PNTP configuration, or a PNTP mask. These terms can be used interchangeably to describe a promise-not-to-peek solution. A given PNTP configuration may be one of many possible solutions that define an exclusion region.

Figure 8A:
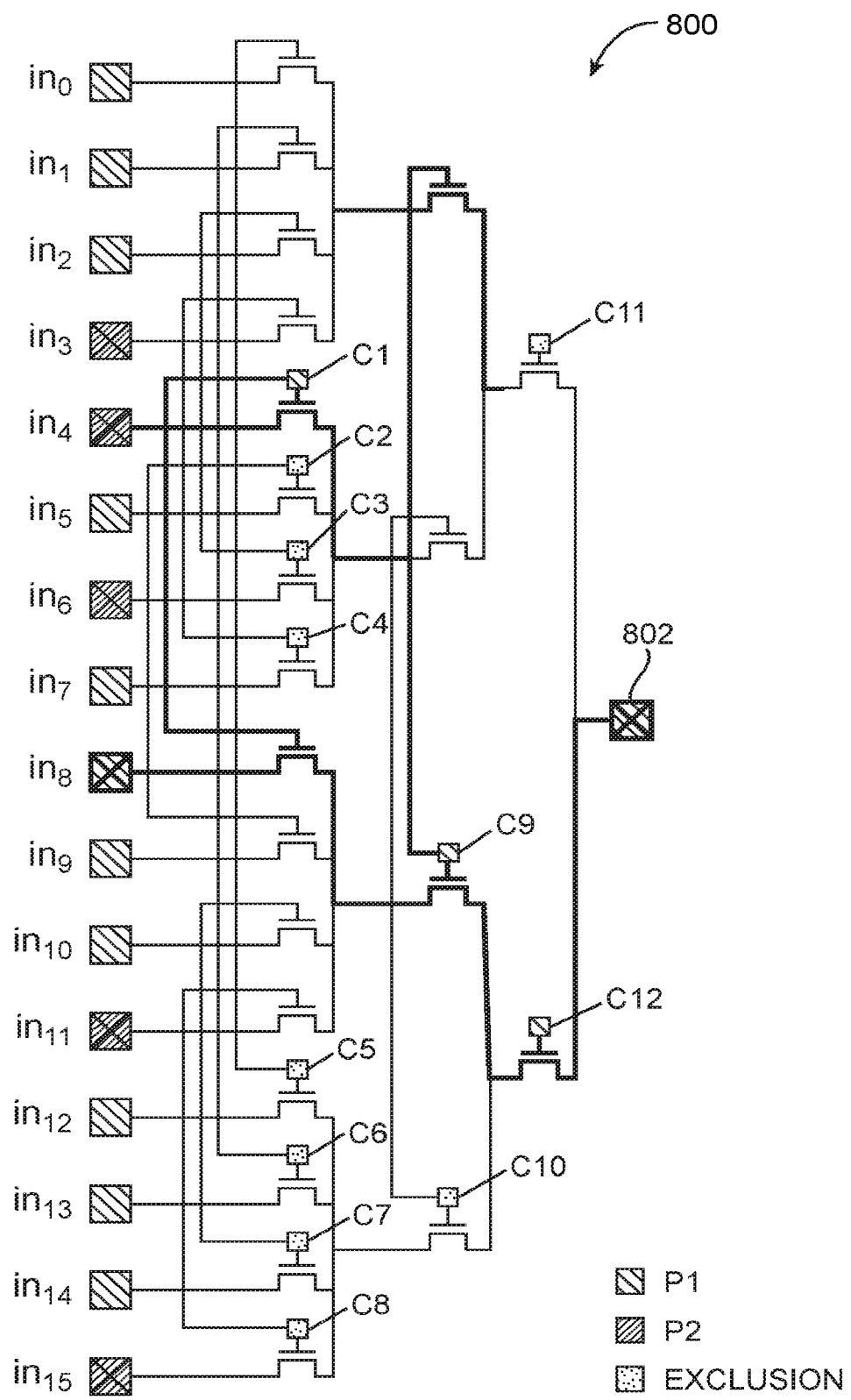
FIG. 8A is a diagram of illustrative routing circuitry having a persona and an associated exclusion configuration in accordance with an embodiment.

FIG. 8A shows a circuit diagram of a 3-level shared configuration bit routing multiplexer 800. The route established by persona P1 connects input port ins to output port 802 by setting configuration bits C1, C9, and C12 (as indicated by the bolded path). Inputs $in_3$, $in_4$, $in_6$, $in_n$, and $in_{15}$ are from a different PR region belonging to P2 and (if tapped) present a peek/poke attack if they can be routed to output 802.

A Boolean constraint indicating configurations bit settings that must exist to avoid a peek/poke attack given the persona's configuration of routing multiplexer 800 may be derived. For the example of FIG. 8A, the Boolean constraint (sometimes referred to as a "satisfiability clause") may be expressed as:

$$\begin{aligned}\text{sat\_clause}=&(!C4 \text{ or } !C9 \text{ or } !C11) \text{ and } (!C1 \text{ or } !C10 \\ &\text{ or } !C11) \text{ and } (!C3 \text{ or } !C10 \text{ or } !C11) \text{ and } (!C8 \text{ or } \\ &!C9 \text{ or } !C12) \text{ and } (!C8 \text{ or } !C10 \text{ or } !C12) \text{ and } \\ &(C1 \text{ and } C9 \text{ and } C12)\end{aligned} \quad (3)$$

where ! signifies an invert or "not" operator. Thus, !C4 means that bit C4 has to be equal to zero to make the overall expression true. The first constraint (!C4 or !C9 or !C11) corresponds to $in_3$; the second constraint (!C1 or !C10 or !C11) corresponds to $in_4$; and so on for the other inputs associated with persona P2. The last constraint corresponds to the current input ins.

The satisfiability clause of equation (3) may be simplified and a Boolean satisfiability solver (sometimes referred to as a SAT solver or a Boolean equation solver) that runs on computing equipment may be used to solve the satisfiability clause and to generate a corresponding solution. Using a SAT solver to compute exclusion configuration bits is sometimes considered and referred to here as performing static peek/poke detection. As an example, the SAT solver may solve expression (3) and arrive at the following solution:

$$\begin{aligned}\text{solution}=&C1 \text{ and } !C2 \text{ and } !C3 \text{ and } !C4 \text{ and } !C5 \text{ and } \\ &!C6 \text{ and } !C7 \text{ and } !C8 \text{ and } C9 \text{ and } !C10 \text{ and } \\ &!C11 \text{ and } C12\end{aligned} \quad (4)$$

The solution spells out the particular settings for the configuration bits to stop a peek/poke attack using partial reconfiguration when shared configuration bits are used. In this example, solution (4) requires that C1, C9, and C12 be set to one and that C2-C8, C10, and C11 be cleared to zero. Thus, the partial reconfiguration mask that is required to prevent a peek/poke attack is equal to {!C2, !C3, !C4, !C5, !C6, !C7, !C8, !C10, !C11}, which is sometimes referred to as a "promise-not-to-peek configuration" or PNTP solution. The promise-not-to-peek configuration can be calculated by identifying the set of bits in the solution that are not set in the persona for the routing mux.

Figure 8B:
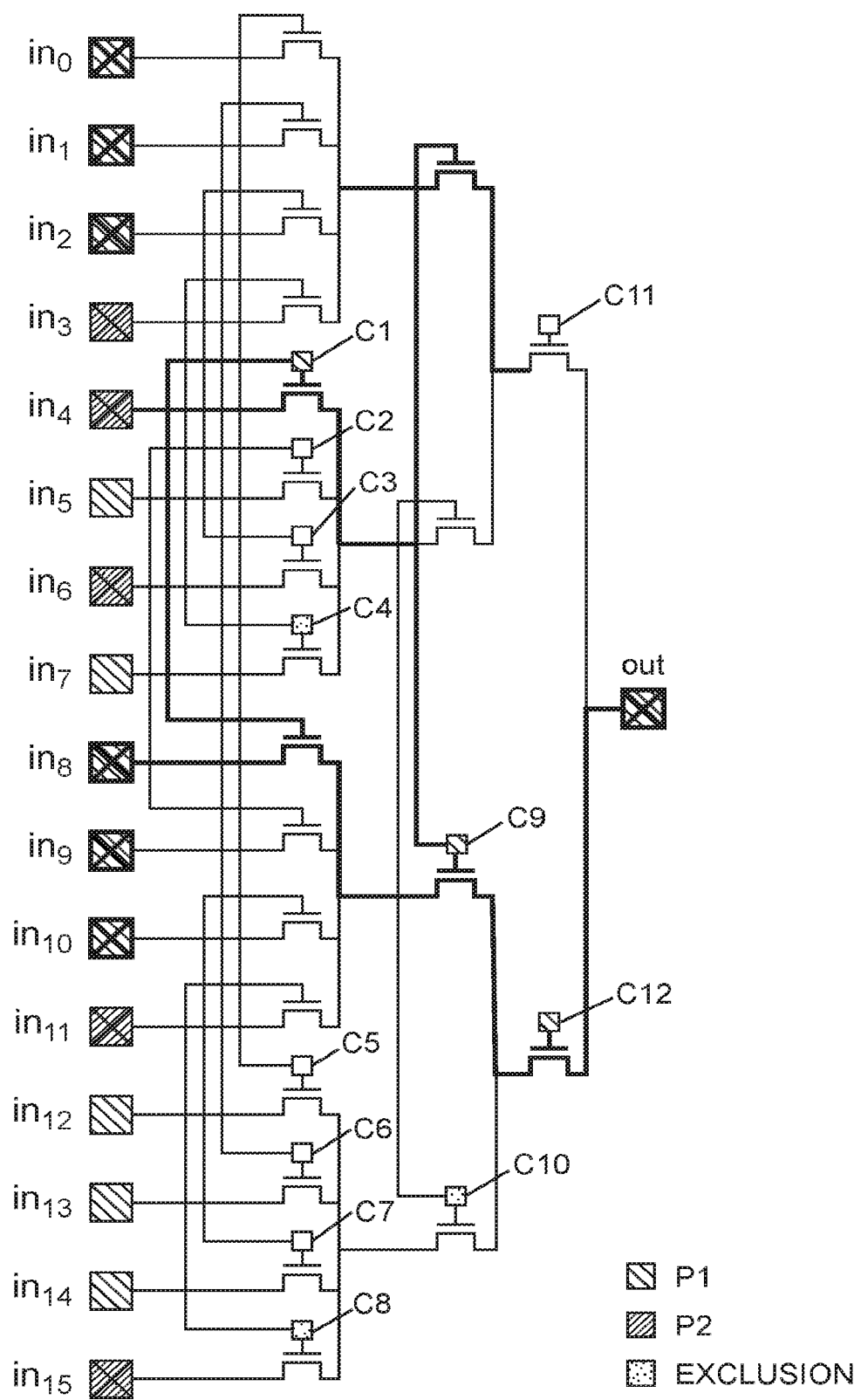
FIGS. 8B and 8C are diagrams illustrating alternate solutions for the persona of FIG. 8A that provide a smaller public "promise not to peek" bit stream in accordance with an embodiment.
Figure 8C:
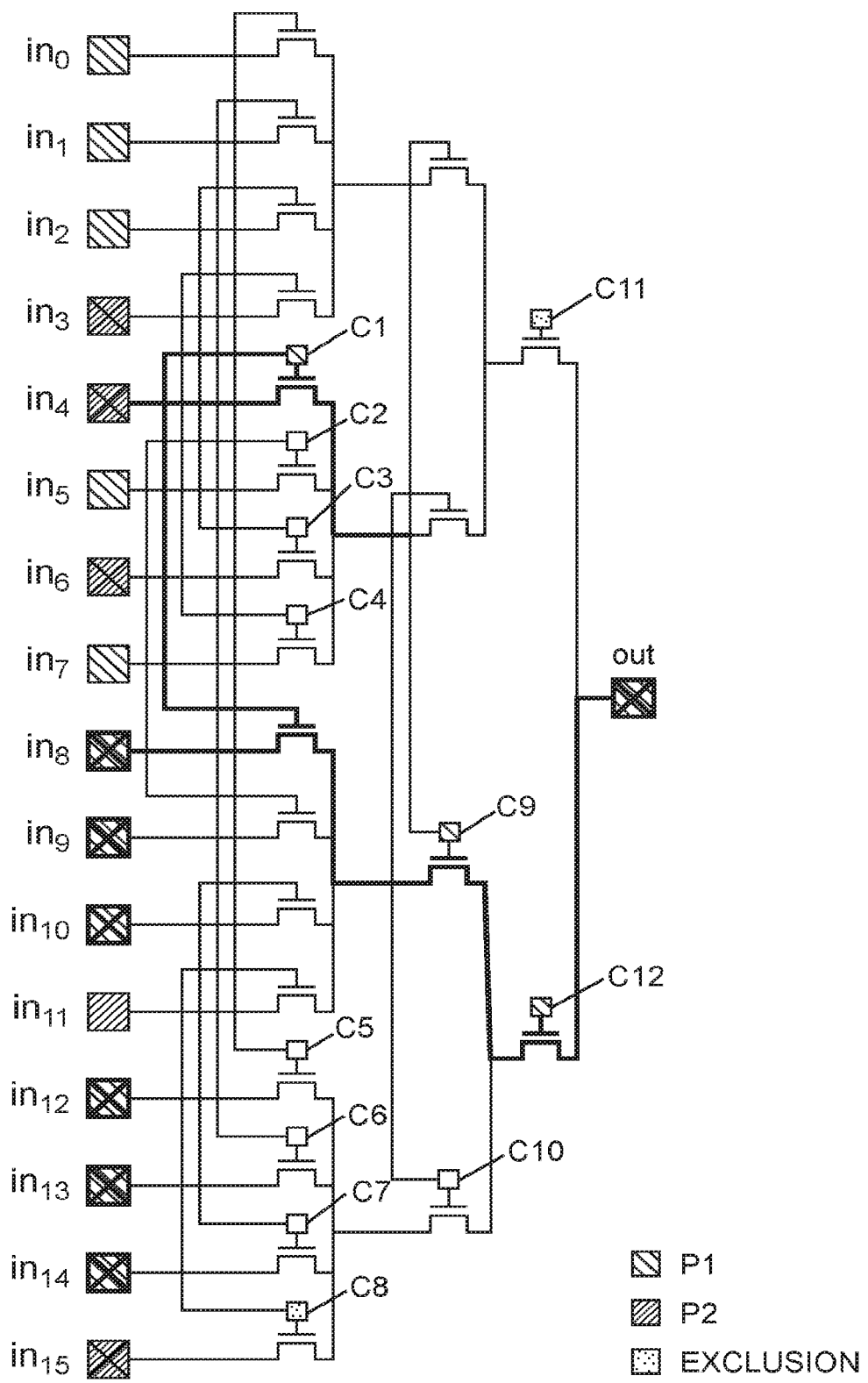

The remaining bits {C1, C9, C12} belong to the standard partial reconfiguration persona's bit stream, which is used to configure the PR persona, and is sometimes referred to as the "private persona bit stream." The actual setting of C1, C9, and C12 should be removed from the promise-not-to-peek configuration since including them would expose the persona's route from ins to output 802. However, from this promise-not-to-peek configuration, the actual route used by the persona at multiplexer 800 can still be extracted using the pigeon-hole principle. If this is a security concern, a smaller promise-not-to-peek configuration that still provides peek/poke protections needs to be generated. One metric that can be used to quantify the vulnerability of the promise-not-to-peek configuration may be referred to as "gain" G, which is calculated by adding up the number of P1 inputs that could potentially be the driving input. These inputs have are bolded in FIGS. 8B and 8C. A higher gain G means that the subset of P1 inputs that could be the input is larger. To find the clearing that exposes the least amount of information, the solving of the Boolean constraint should be solved while maximizing G. Two minimal cost exclusion configuration solutions with a G of 6 for this persona's configuration are shown in FIGS. 8B and 8C. The solution' of FIG. 8B is reduced as follows:

$$\begin{aligned}\text{solution}'=&C1 \text{ and } \cancel{!C2} \text{ and } \cancel{!C3} \text{ and } !C4 \text{ and } \\ &\cancel{!C5} \text{ and } \cancel{!C6} \text{ and } \cancel{!C7} \text{ and } !C8 \text{ and } C9 \text{ and } \\ &!C10 \text{ and } \cancel{!C11} \text{ and } C12 \text{ which simplifies to:} \\ =&C1 \text{ and } !C4 \text{ and } !C8 \text{ and } C9 \text{ and } !C10 \text{ and } \\ &C12\end{aligned} \quad (5)$$

Similarly, the solution" of FIG. 8C is computed as follows:

$$\begin{aligned}\text{solution}''=&C1 \text{ and } \cancel{!C2} \text{ and } \cancel{!C3} \text{ and } \cancel{!C4} \text{ and } \\ &\cancel{!C5} \text{ and } \cancel{!C6} \text{ and } \cancel{!C7} \text{ and } !C8 \text{ and } C9 \text{ and } \\ &\cancel{!C10} \text{ and } !C11 \text{ and } C12 \text{ which simplifies to:} \\ =&C1 \text{ and } !C8 \text{ and } C9 \text{ and } !C11 \text{ and } C12\end{aligned} \quad (6)$$

Thus, the promise-not-to-peek configuration for solution' is equal to {!C4, !C8, !C10}, whereas the promise-not-to-peek configuration for solution" is equal to {!C8, !C11}. In solution', outside parties can only determine that the route is one of the six bolded inputs in FIG. 8B, whereas in solution", outside parties can only determine that the route is one of the six bolded inputs in FIG. 8C. Both solutions divulge the same amount of information, so both solutions are assigned a gain of 6. It may be desirable to reduce the amount of information divulged by maximizing the gain. In the case of a tie in gain, other factors unrelated to information disclosure may make it preferable to choose a random solution or the one that has fewer bits in it. In the two cases shown in FIGS. 8B and 8C, each configuration bit belongs to exactly one region—either a client or server region or the exclusion region. As shown in this example, there is not a single exclusion region since it is possible to compute multiple solutions given the PNTP constraints.

Figure 8D:
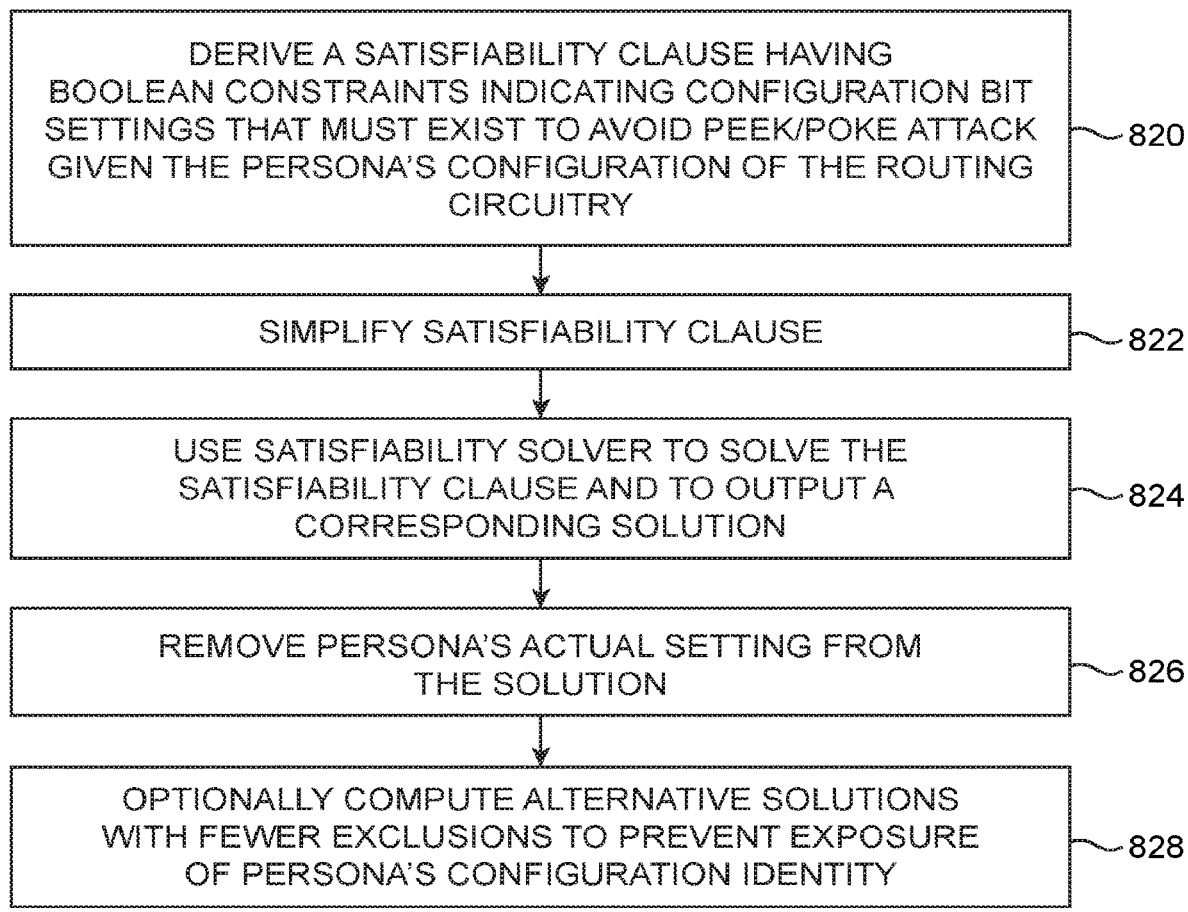
FIG. 8D is a flow chart of illustrative steps for performing static peek detection in accordance with an embodiment.

FIG. 8D is a flow chart of illustrative steps for performing static peek detection in accordance with an embodiment. At step 820, tools 420 (see FIG. 4) or the user may derive a satisfiability clause having Boolean constraints indicating configuration bit settings that should exist to avoid peek/poke attack given the persona's configuration of the routing multiplexer.

At step 822, the satisfiability clause may be simplified. At step 824, a SAT solver (e.g., a SAT solver that is part of tools 420, that is running on static peek detection circuitry on device 10, or that is running somewhere in the overall system) may be used to solve the satisfiability clause and to output a corresponding solution.

At step 826, the persona's actual routing settings may be removed from the solution to prevent exposure of the persona's routing of a particular mux input to the mux output. Optionally, alternate solutions may be computed with fewer exclusions to prevent exposure of a persona's configuration identity (step 828). For example, gain G may be maximized by removing exclusion bits from the solution, as shown in calculation of solutions (5) and (6).

In the case of non-shared configuration bits, the exclusion region was static based on the regions involved and could be calculated offline and treated as a special partial reconfiguration. In the case of shared configuration bits, the exclusion configuration is dynamic and is based on the mixture of personas that are simultaneously loaded.

To calculate the exclusion configuration, each persona provides its private persona configuration and public promise-not-to-peek configuration. The exclusion configuration is the union of these bit streams. When every PR region (i.e., every PR persona) guarantees it does not peek, poke protection is achieved through symmetry. The exclusion configuration is no longer a single static configuration, but may be obtained by applying the union of each active personas' promise-not-to-peek configuration. Each promise-not-to-peek configuration may be applied in any sequence to compute the exclusion configuration.

An attack that is similar to a peek attack is one where the owner of the routing multiplexer sets configuration bits to create parasitic loading and/or malicious contention. Such attacks can affect the timing of other partial reconfiguration regions. There may be cases where this parasitic loading is unavoidable due to shared configuration bits such as $in_4$ in FIGS. 8B and 8C. However, there are cases where one region owner can maliciously set bits to create parasitic loading and/or parasitic contention. Either of these attacks can be used to take a different region out of the specification which, in some embodiments breaks the timing and/or function of the design in the other region and in other embodiments can cause premature aging and/or cause a permanent denial of service.

Figure 9A:
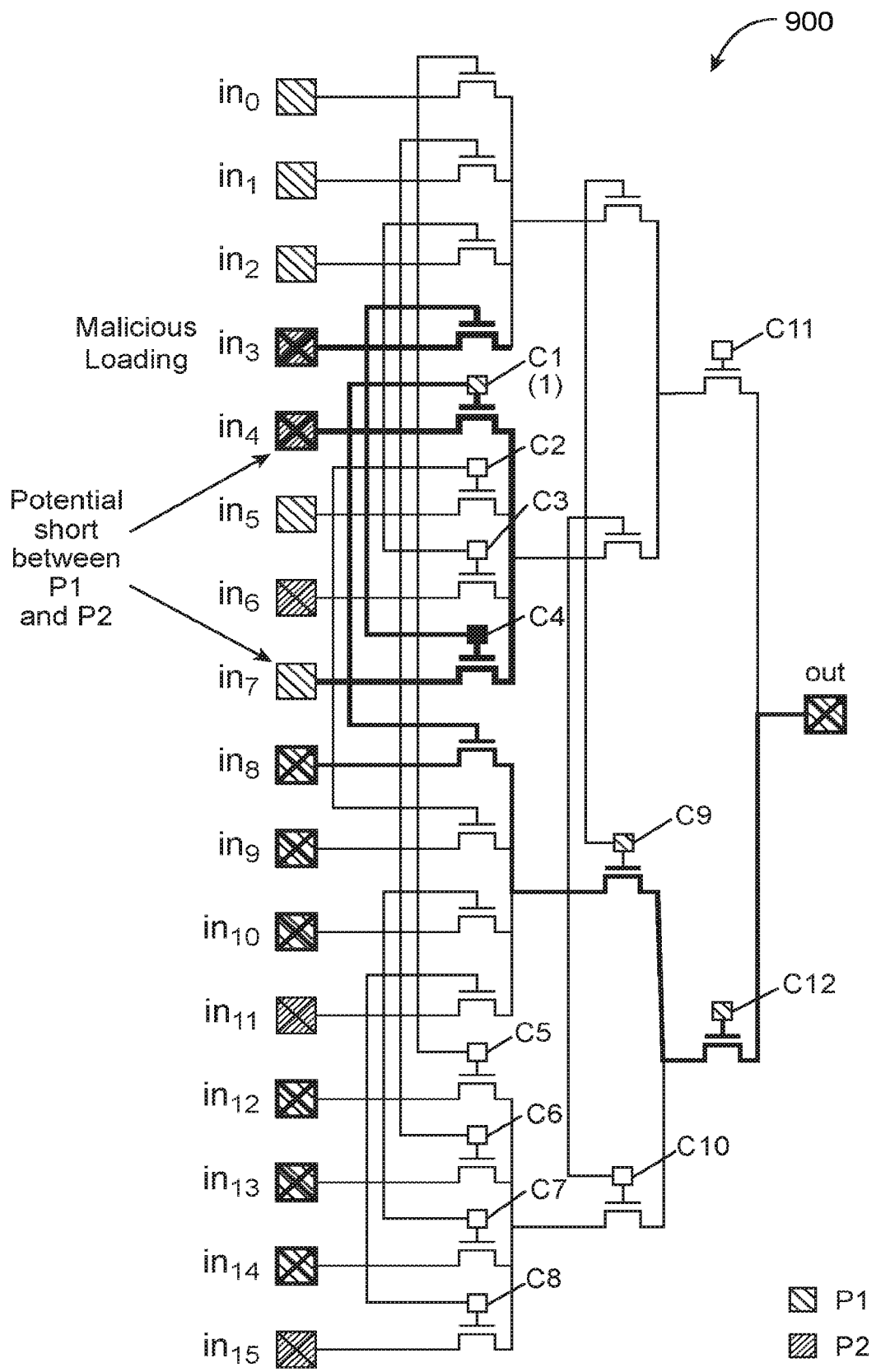
FIGS. 9A and 9B are diagrams illustrating malicious attacked between two different parties in accordance with an embodiment.
Figure 9B:
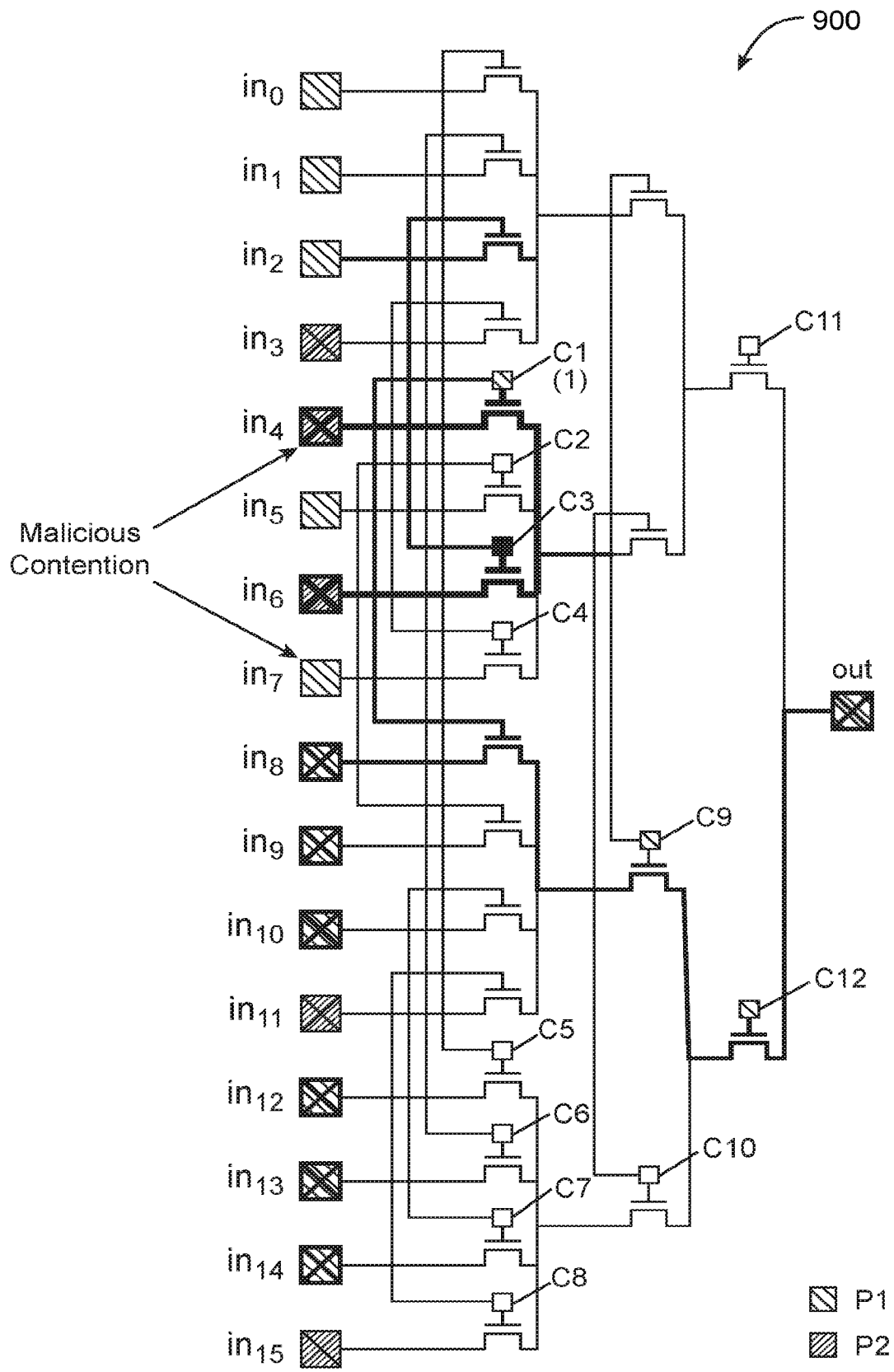

Various forms of malicious attacks are shown in FIGS. 9A and 9B (see bolded contending paths). For multiplexer 900 in the example of FIG. 9A, input $in_3$ creates malicious loading since setting configuration bit C4 has no functional value for P1's region. The setting of configuration bit C4 also creates a potential contention between inputs $in_4$ (belonging to P2) and $in_7$ (belonging to P1). There was already non-malicious loading on $in_4$, but now the short between inputs $in_7$ and $in_4$ creates the potential for contention on $in_4$ when the value of $in_4$ and $in_7$ are not the same.

For multiplexer 900 in the example of FIG. 9B, malicious contention is created between inputs $in_4$ and $in_6$ with the setting of configuration bit C3, which has no functional purpose for P1's region. This contention is unknown to P2's region, and any time inputs $in_4$ and $in_6$ have different values, contention occurs which in some embodiments can break the timing and function of P2's region.

To counter such types of attacks shown in FIGS. 9A and 9B, there are two checks that can occur. The first check is that the owning region configures the routing multiplexer so that it creates a legitimate route. The second check is that the only one configuration bit is set in each stage of the multi-stage multiplexer. These two checks can be combined to check that each routing multiplexer that has region-crossing connections sets none of its configuration bits or that it sets only one configuration bit per stage. The process for parasitic loading and contention checking is shown in the flow chart of FIG. 9C. This loading and contention checking may be performed using dynamic checking circuitry of the type shown in FIG. 7A (as an example).

The checking process starts at the first multiplexing layer i=0 (step 950). At step 952, all bits at level i is set equal to one (e.g., the dynamic checking circuitry may calculate "Mask $A_1$", where a bit is set if the configuration bit is in layer i).

At step 954, the dynamic checking circuitry may securely determine which bits are set for the multiplexer. For example, the dynamic checking circuitry may calculate "Mask $B_i$" that is equal to the intersection of "Mask $A_1$" and CRAM*. CRAM* represents the current on-chip programming.

At step 956, the dynamic checking circuitry may determine if the multiplexer has one bit set or no bits set per stage. For example, if Mask $B_1$ has more than one bit set, then an alert signal may be asserted to indicate that the current configuration is illegal.

At step 958, the dynamic checking circuitry may calculate which bits in layer (i+1), which is the next layer, would need to be set to continue a legal path. For example, the dynamic checking circuitry may calculate "Mask $C_i$" with set bits that would continue the path to the next multiplexing layer given Mask $B_1$ obtained from step 954.

Figure 9C:
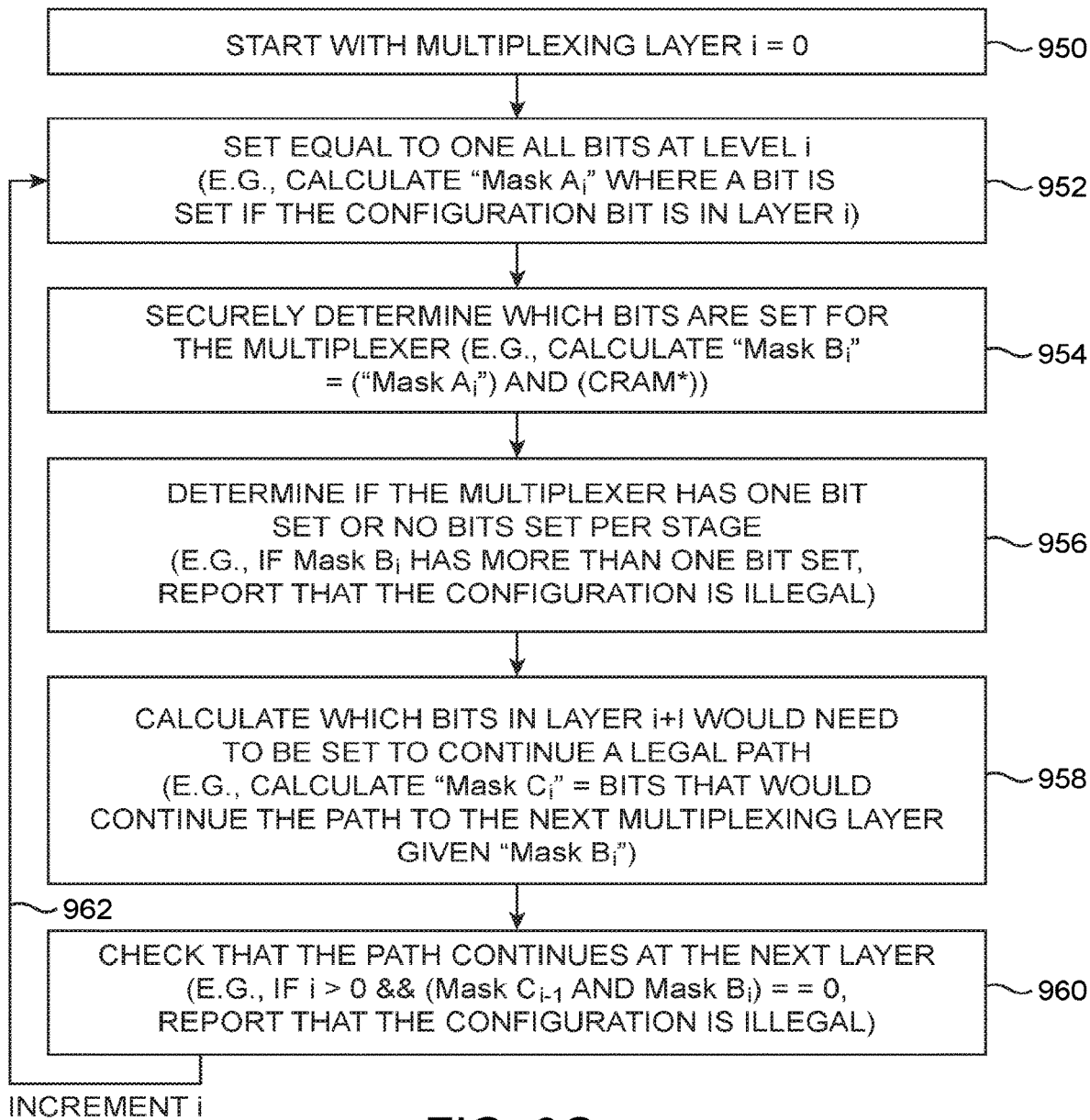
FIG. 9C is a flow chart of illustrative steps for performing dynamic parasitic loading and contention checking in accordance with an embodiment.

At step 960, the dynamic checking circuitry may check that the path actually continues at the next layer. For example, if i>0 and if the intersection of Mask and Mask $B_1$ is zero, then an alert signal may be asserted to indicate that the current configuration is illegal. Processing may then loop back to step 952 to compute masks for the next multiplexer layer by incrementing i, as indicated by path 962, until the last layer has been checked. The illustrative process of FIG. 9C is applied for each persona associated with a routing multiplexer. Whenever a persona is changed, the check must be recalculated.

Figure 9D:
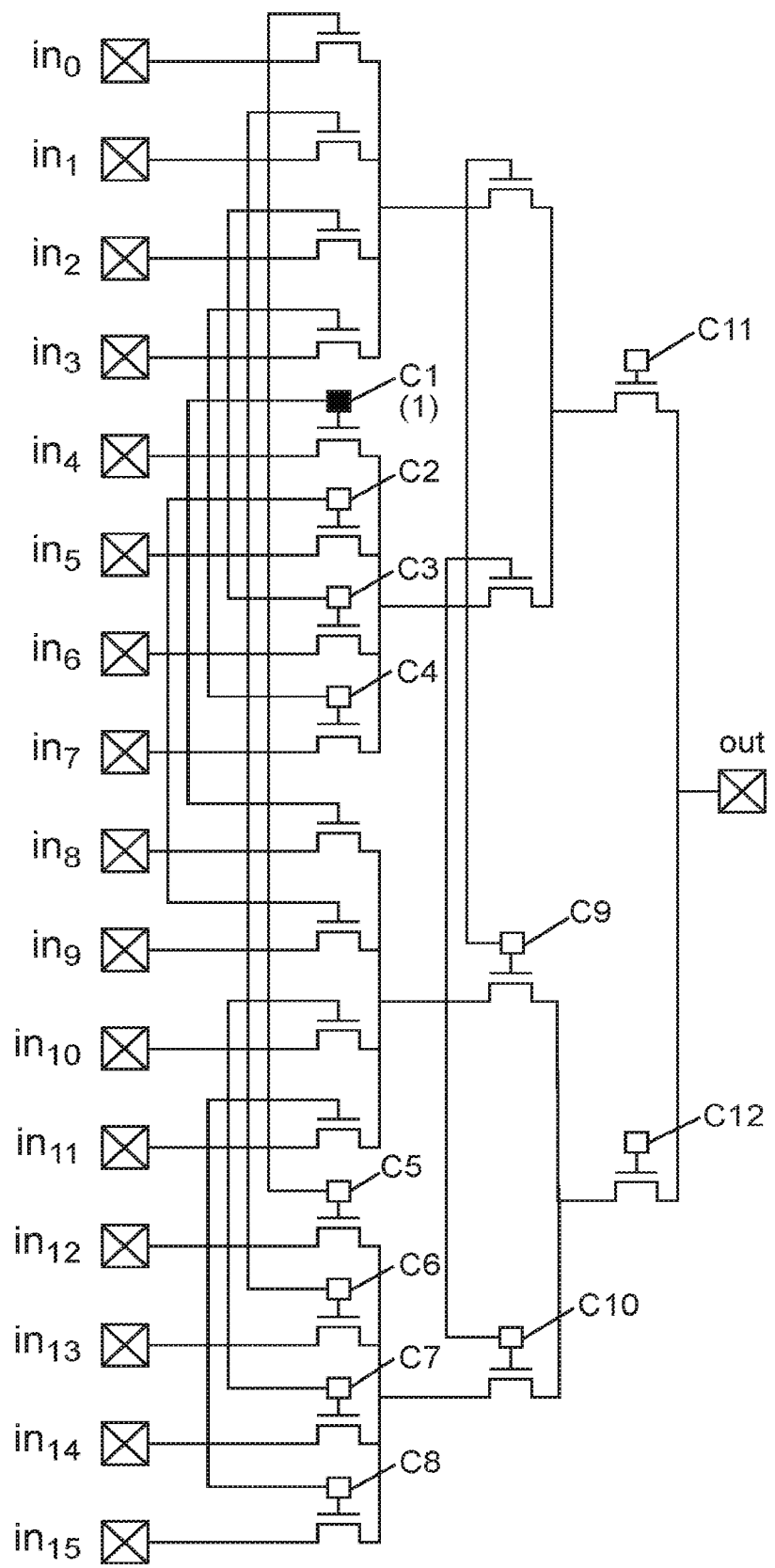

An example of using this process to detect parasitic loading is shown in FIGS. 9D and 9E. In this particular example, CRAM* only has C1 set (as indicated by the solid black bit). Mask $B_0$ will therefore only have bit C1 set. Note that only bits C9 and C10 are set in Mask $C^0$ since only those two bits will continue the paths activated by bit C1. Mask $B_1$ has no set bits since there is no intersection between Mask $A_i$ and CRAM*. Since Mask $B^1$ is zero, the intersection of Mask $B_1$ and Mask $C_0$ will also be zero, activating step 960 of FIG. 9C. In other words, this path is not continued, so a parasitic loading is detected.

Figure 9F:
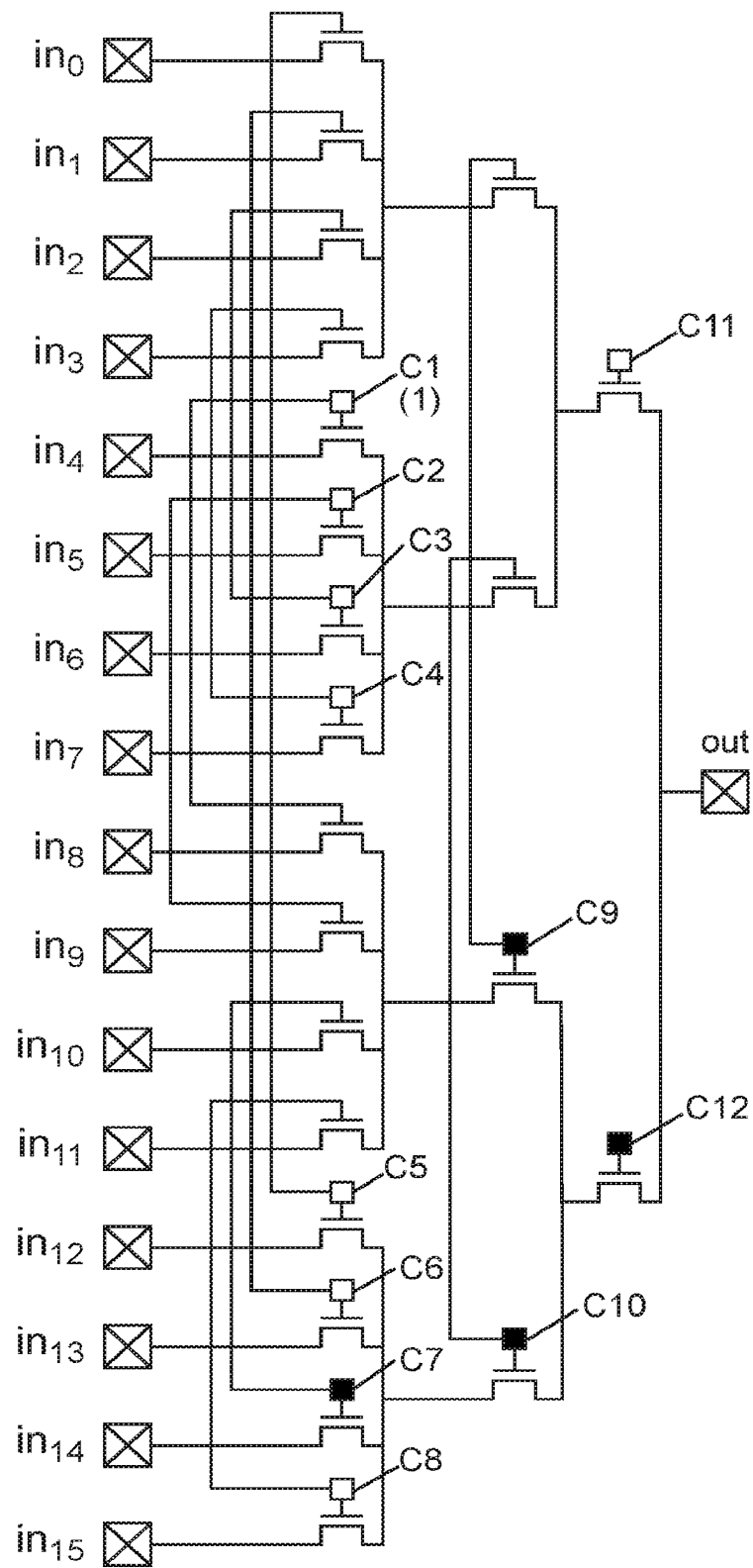

An example of using this process to detect contention is shown in FIGS. 9F and 9G. In this particular example, CRAM* has bits C7, C9, C10, and C12 set (as indicated by the solid black bits). Mask $B_0$ will therefore only have bit C7 set. Note that only bits C9 and C10 are set in Mask $C^0$ since only those two bits will continue the paths activated by bit C7. Mask $B^1$ now has bits C9 and C10 set, which represent the intersection between Mask $A_1$ and CRAM*. Since Mask $B^1$ has two bits set (activating step 956 of FIG. 9C), this configuration is flagged as illegal since it creates contention.

The process described in connection with FIGS. 9A-9G is a secure dynamic check, but a static extraction and enhancement to the exclusion configuration is also possible, as described below in connection with FIGS. 10A and 10B. The enhancement is to disallow the configuration bits that would connect to contending or loading region.

Figure 10A:
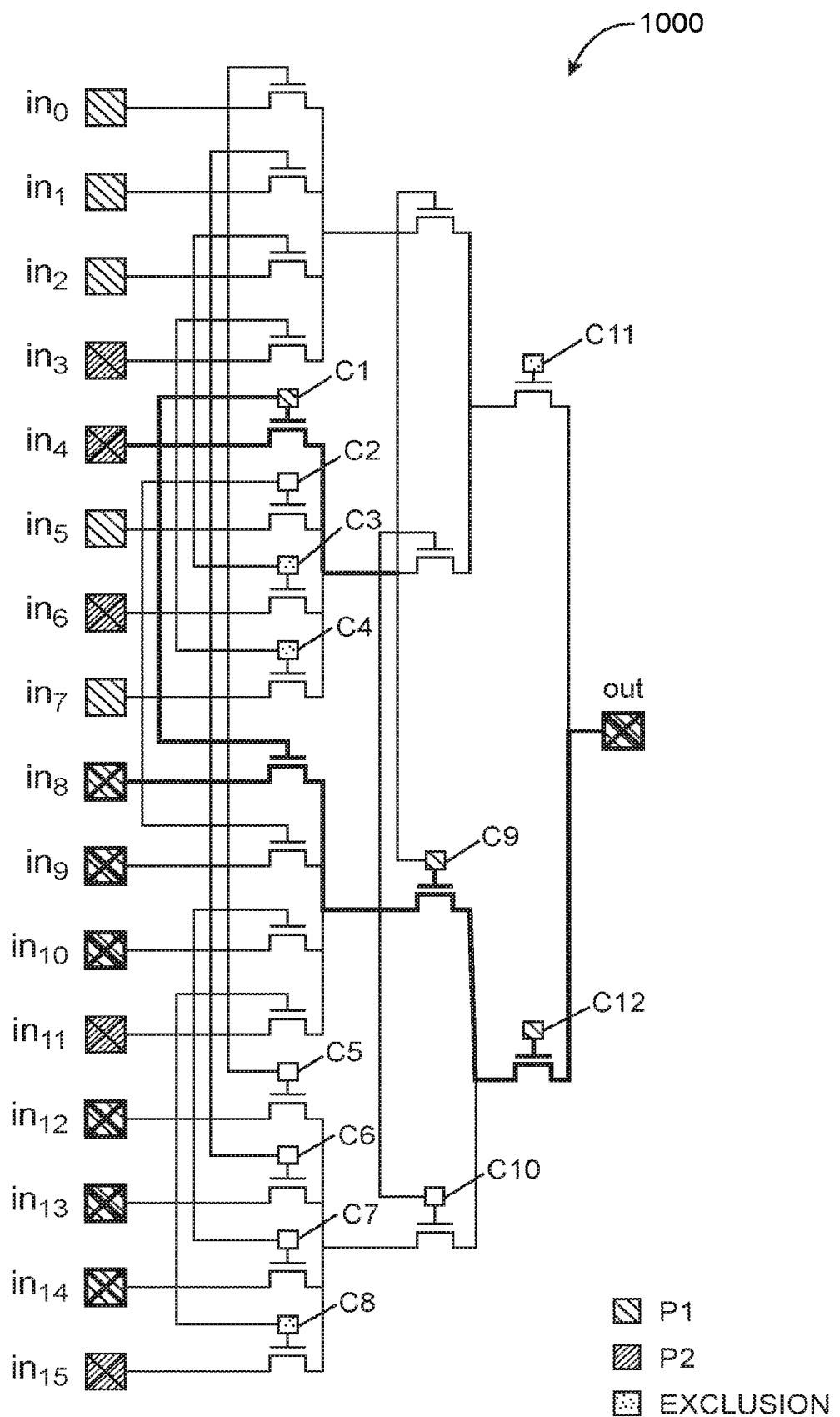
FIG. 10A is a diagram of illustrative routing circuitry having a persona and an associated exclusion configuration to reduce malicious contention and loading on the persona in accordance with an embodiment.

As shown in multiplexer 1000 in the example of FIG. 10A, the exclusion configuration bits are C3, C4, and C8 in order to exclude the malicious contention or loading of persona P2. The constraint is extended to disable these three bits. The satisfiability clause may then be expressed as:

sat_clause=(!C4 or !C9 or !C11) and (!C1 or !C10 or !C11) and (!C3 or !C10 or !C11) and (!C8 or !C9 or !C12) and (!C8 or !C10 or !C12) and (C1 and C9 and C12) and (!C3 and !C4 and !C8) (7)

where the bolded portion in equation 7 represents the additional constraint. The SAT solver may solve equation (7) and arrive at the following solution:

solution=C1 and !C2 and !C3 and !C4 and !C5 and !C6 and !C7 and !C8 and C9 and !C10 and !C11 and C12 (8)

The bolded portion of the solution (corresponding to the additional constraints) cannot be removed because it prevents undesired loading and contention. As before, the solution can be reduced to help increase gain G. The solution can be reduced as follows:

solution'=C1 and ~~!C2~~ and !C3 and !C4 and and ~~!C6~~ and ~~!C7~~ and !C8 and C9 and ~~!C10~~ and !C11 and C12 which simplifies to:

$$=C1 \text{ and } !C3 \text{ and } !C4 \text{ and } !C8 \text{ and } C9 \text{ and } !C11 \text{ and } C12 \quad (9)$$

Thus, the promise-not-to-peek configuration for solution' of (9) is equal to {!C3, !C4, !C8, !C11}. Note that the dynamic checking does not dynamically check against the path through the multiplexer being broken, but if it were to do so, the parasitic loading would be limited to only P2's inputs that were unavoidable given the promises made by P1's bit stream (e.g., P2 can protect itself against the worst-case unavoidable loading).

Figure 10B:
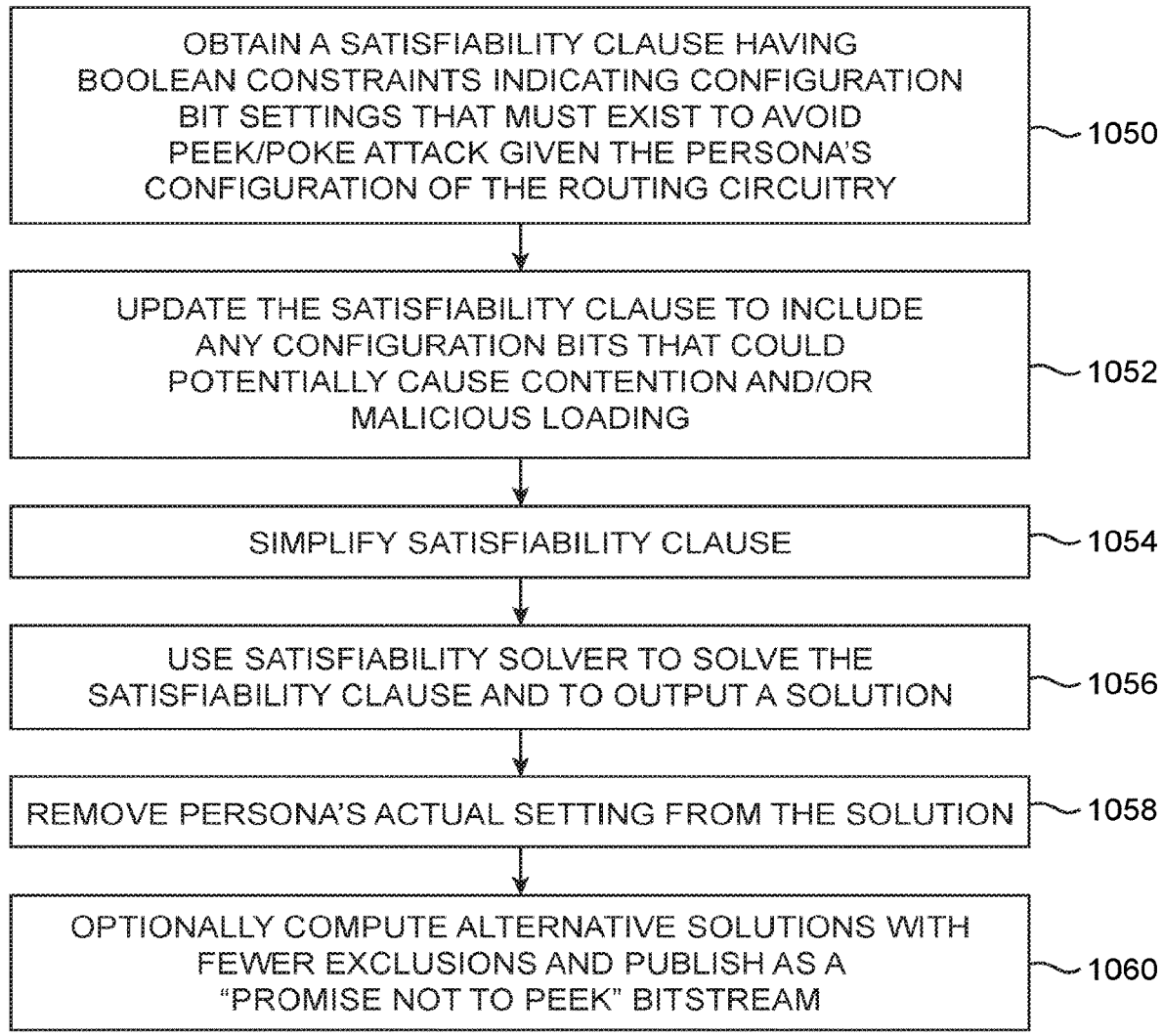
FIG. 10B is a flow chart of illustrative steps for generating a "promise-not-to-peek" solution in accordance with an embodiment.

FIG. 10B is a flow chart of illustrative steps for generating a promise-not-to-peek configuration with the enhancement of the parasitic loading and contention prevention. At step 1050, tools 420 (FIG. 4) or the user may derive a satisfiability clause having Boolean constraints indicating configuration bit settings that should exist to avoid peek/poke attack given the persona's configuration of the routing multiplexer circuitry.

At step 1052, the satisfiability clause be updated to include any configuration bits that could potentially cause contention and/or malicious loading. At step 1054, the updated satisfiability clause may be simplified.

At step 1056, a SAT solver (e.g., a SAT solver that is part of tools 420, that is running on static peek detection circuitry on device 10, or that is running somewhere in the overall system) may be used to solve the satisfiability clause and to output a corresponding solution.

At step 1058, the persona's actual routing settings may be removed from the solution to prevent exposure of the persona's routing of a particular mux input to the mux output. Optionally, alternate solutions may be computed with fewer exclusions to prevent exposure of a persona's configuration functionality (step 1060). For example, gain G may be maximized by removing exclusion bits from the solution, as shown in calculation of solution (9).

Figure 11:
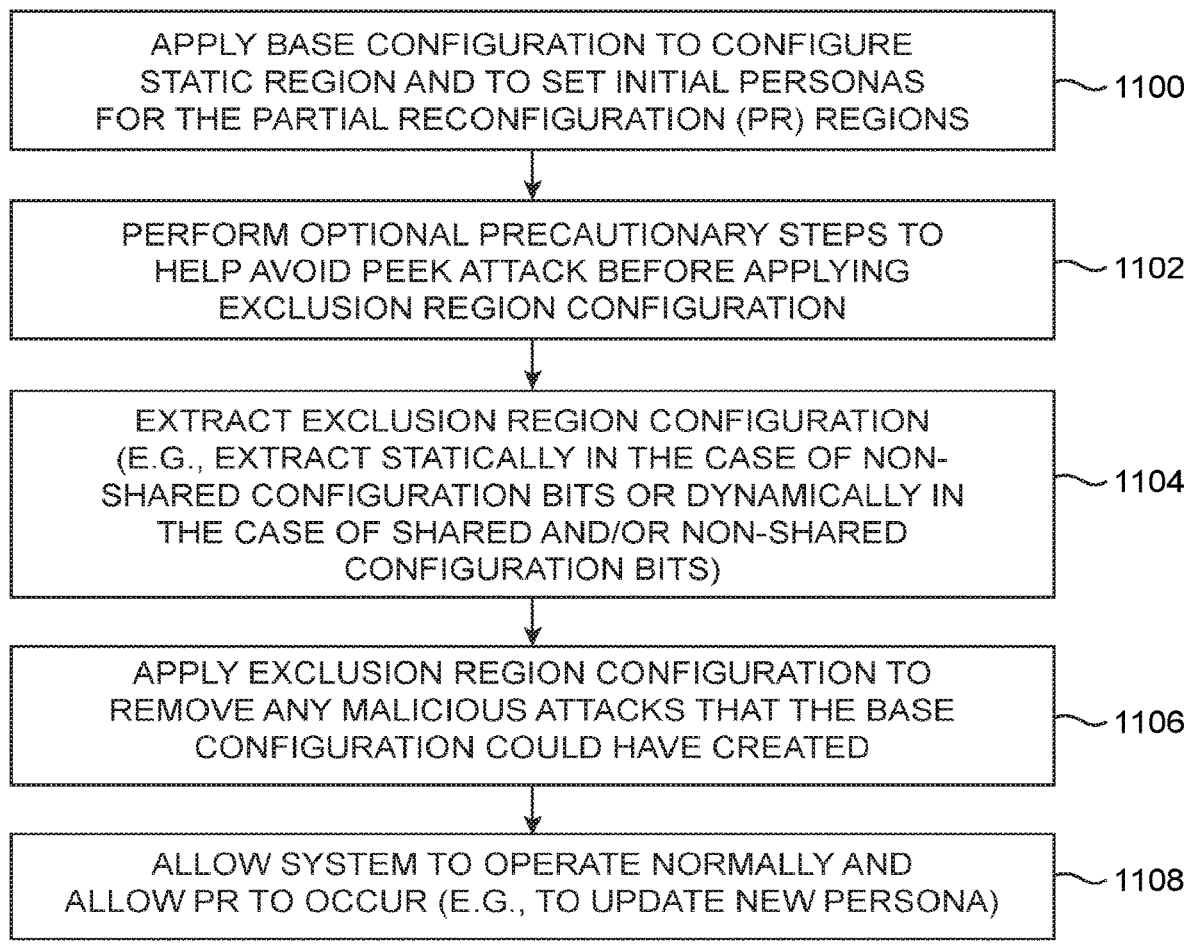
FIG. 11 is a flow chart of illustrative steps for providing protection against peek and poke attacks when operating a programmable integrated circuit in accordance with an embodiment.

FIG. 11 is a flow chart of illustrative steps for providing protection against peek and poke attacks when operating a programmable integrated circuit in accordance with an embodiment. At step 1100, the base configuration is applied to configure the static region and to set the initial personas for the partial reconfiguration regions.

Each persona's private persona bit stream may be checked against the public promise-not-to-peek configuration that was generated from and associated with the private bit stream. If a given persona's bit stream is not in violation (i.e., if a persona's configuration does not violate the promise-not-to-peek configuration by setting any of the bits that are marked to be cleared in the promise-not-to-peek configuration), then that persona's bit stream is signed. Once the private bit stream is signed, secure processors on device 10 may be used to authenticate that the private bit stream is signed. After this has been verified, the private bit streams can then be loaded via partial reconfiguration.

There may, however, be a point in time after a new persona is loaded and before the exclusion configuration is applied where the new persona could create a malicious persona that peeks. Thus, precautionary steps may optionally be taken to help avoid peek/poke attack before applying the exclusion region configuration (step 1102).

As an example, to avoid this peek attack, the persona configuration could be forced to check that it does not violate its promises in a trusted checker. For example, the persona configuration is first loaded onto a configurable device. Next, the configuration bits are calculated on the device as the intersection of the persona's configuration and persona's promise-not-to-peek configuration and is written back to the device. FIG. 12A is a diagram showing how a private persona's configuration can be checked against the associated promise-not-to-peek (PNTP) configuration, which is equivalent to solution' as shown in expression (5) above. In particular, the bits to clear in the PNTP configuration should be set to ones (e.g., C4, C8, and C10 should be set). In this example, the intersection between the private persona and the PNTP configuration is zero, so the corresponding check bits are all zeroes.

FIG. 12B is a diagram of another example showing how a private persona's configuration can be checked against the associated promise-not-to-peek (PNTP) configuration, which is equivalent to solution" as shown in expression (6) above. In particular, the bits to clear in the PNTP configuration should be set to ones (e.g., only C8 and C11 should be set). In this example, the intersection between the private persona and the PNTP configuration is also zero, so the corresponding check bits are all zeroes. If the check bits are all zeros, the private persona can be signed. If they are not, then the persona violates its promise.

As yet another example, the device applies the promise-not-to-peek partial reconfiguration after the persona's partial reconfiguration while the device holds the new persona in a state that is not executing so that any peek or poke attack is not active. After applying the promise-not-to-peek PR configuration, the device allows the new persona to begin executing.

As another embodiment, the device clears bits in the plaintext configuration that are in the exclusion configuration before performing the partial reconfiguration.

As yet another embodiment, the device performs a tight interleaving of applying the persona's partial reconfiguration with the exclusion partial reconfiguration to minimize the potential for a malicious persona to perform a peek.

Using these various methods helps improve peek/poke protection when switching between personas. The application of the exclusion configuration and/or dynamic checking afterwards removes or minimizes the duration of peek and poke attacks that come from other physical and/or other unanticipated attacks.

At step 1104, the exclusion region configuration is either extracted statically in the case of non-shared configuration bits or dynamically in the case of shared/non-shared configuration bits (e.g., using the steps described in FIGS. 7-10). It is assumed that in the dynamic case, the exclusion region configuration is updated when a persona changes.

At step 1106, the exclusion region configuration is applied to remove any malicious attacks that the base configuration could have created. At step 1108, the system begins to execute including allowing partial reconfigurations to occur. In one suitable arrangement, the exclusion region configuration is applied using partial reconfiguration after each partial reconfiguration of the clients to guard against malicious partial reconfigurations. In other suitable arrangements, the exclusion region configuration may be applied using partial reconfiguration at a regular rate, at random intervals, and/or at the request of the server or client. When partial reconfiguration is not used, a dynamic check is used in place of or in parallel with applying the exclusion region configuration through partial reconfiguration.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Examples

The following examples pertain to further embodiments.

Example 1 is an integrated circuit implemented using a method comprising: obtaining a circuit design for the integrated circuit, wherein a first portion of the circuit design is associated with a first party in a multi-tenant system, wherein a second portion of the circuit design is associated with a second party in the multi-tenant system, and wherein the second party is different than the first party; generating a satisfiability clause having constraints that prevent peek attacks between the first and second parties in the multi-tenant system; solving the satisfiability clause to generate a corresponding promise-not-to-peek configuration; determining whether a bit stream associated with the first party violates the promise-not-to-peek configuration; in response to determining that the bit stream does not violate the promise-not-to-peek configuration, signing the bit stream; and after the bit stream is signed, loading the signed bit stream onto the integrated circuit.

Example 2 is the method of example 1, further comprising simplifying the satisfiability clause.

Example 3 is the method of example 1, wherein solving the satisfiability clause comprises using a Boolean equation solver to solve the satisfiability clause and to output a solution.

Example 4 is the method of example 3, further comprising selectively removing bit settings associated with the first party from the solution to generate the promise-not-to-peek configuration.

Example 5 is the method of example 3, further comprising generating an additional solution with fewer settings than the solution to prevent exposing the functionality of the first party.

Example 6 is the method of any one of examples 1-5, wherein the circuit design is a design of a routing multiplexer, and wherein the constraints of the satisfiability clause correspond to settings associated with different inputs of the routing multiplexer.

Example 7 is an integrated circuit, comprising: a first partial reconfiguration region associated with a first party of a multi-tenant system; a second partial reconfiguration region associated with a second party of the multi-tenant system, wherein the second party is different than the first party; and dynamic peek detection circuitry that is configured to compute configuration settings that prevent peek attacks between the first and second parties.

Example 8 is the integrated circuit of example 7, further comprising a routing multiplexer that is at least partially configured by the first partial reconfiguration region and the second partial reconfiguration region.

Example 9 is the integrated circuit of example 8, wherein the routing multiplexer has a plurality of layers, wherein the dynamic peek detection circuitry is further configured to calculate a first mask, and wherein a bit in the first mask is set if that bit is in a first layer in the plurality of layers.

Example 10 is the integrated circuit of example 9, wherein the dynamic peek detection circuitry is further configured to calculate a second mask by intersecting the first mask with a current on-chip configuration of the integrated circuit.

Example 11 is the integrated circuit of example 10, wherein the dynamic peek detection circuitry is further configured to detect contention between the first and second parties by determining whether the second mask has more than one bit set.

Example 12 is the integrated circuit of example 10, wherein the dynamic peek detection circuitry is further configured to calculate a third mask by determining which bits would route any set bits in the second mask to a second layer in the plurality of layers following the first layer.

Example 13 is the integrated circuit of example 12, wherein the dynamic peek detection circuitry is further configured to compute an intersection between the third mask and an additional second mask associated with the second layer.

Example 14 is the integrated circuit of example 13, wherein the dynamic peek detection circuitry is further configured to detect parasitic loading between the first and second parties by determining whether the intersection between the third mask and the additional second mask is zero.

Example 15 is the integrated circuit of example 14, wherein the dynamic peek detection circuitry is further configured to compute the first, second, and third masks in a secure manner.

Example 16 is a method of operating a multi-tenant system on an integrated circuit, comprising: loading a base configuration onto the integrated circuit to configure a static region on the integrated circuit and to configure partial reconfiguration regions corresponding to multiple personas; extracting an exclusion region configuration; and applying the exclusion region configuration to the integrated circuit to remove malicious attacks created by the base configuration.

Example 17 is the method of example 16, wherein extracting the exclusion region configuration comprises statically extracting the exclusion region configuration in the presence of non-shared configuration bits controlling a multiplexer on the integrated circuit.

Example 18 is the method of example 16, wherein extracting the exclusion region configuration comprises dynamically extracting the exclusion region configuration in the presence of shared or non-shared configuration bits controlling a multiplexer on the integrated circuit.

Example 19 is the method of any one of examples 16-18, further comprising allowing partial reconfiguration operations associated with new personas to occur only after applying the exclusion region configuration to the integrated circuit.

Example 20 is the method of any one of examples 16-18, further comprising allowing a partial reconfiguration operation associated with a new persona to occur only after checking a private persona configuration of the new persona against the exclusion region configuration.

Example 21 is integrated circuit design tools, comprising: means for obtaining a circuit design for an integrated circuit, wherein a first portion of the circuit design is associated with a first party in a multi-tenant system, wherein a second portion of the circuit design is associated with a second party in the multi-tenant system, and wherein the second party is different than the first party; means for generating a satisfiability clause having constraints that prevent peek attacks between the first and second parties in the multi-tenant system; means for solving the satisfiability clause to generate a corresponding promise-not-to-peek configuration; means for determining whether a bit stream associated with the first party violates the promise-not-to-peek configuration; means for signing the bit stream in response to determining that the bit stream does not violate the promise-not-to-peek configuration; and means for loading the signed bit stream onto the integrated circuit after the bit stream is signed.

Example 22 is the integrated circuit design tools of example 21, wherein the means for solving the satisfiability clause comprises means for using a Boolean equation solver to solve the satisfiability clause and to output a solution.

Example 23 is the integrated circuit design tools of example 22, further comprising means for selectively removing bit settings associated with the first party from the solution to generate the promise-not-to-peek configuration.

Example 24 is the integrated circuit design tools of example 22, further comprising means for generating an additional solution with fewer settings than the solution to prevent exposing the functionality of the first party.

Example 25 is the integrated circuit design tools of any one of examples 21-24, wherein the circuit design is a design of a routing multiplexer, and wherein the constraints of the satisfiability clause correspond to settings associated with different inputs of the routing multiplexer.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

The invention claimed is:

1. An article of manufacture comprising one or more tangible, non-transitory, machine-readable media comprising instructions that, when executed by one or more processors, cause the one or more processors to:
    obtain a circuit design for an integrated circuit, wherein a first portion of the circuit design is associated with a first party in a multi-tenant system, wherein a second portion of the circuit design is associated with a second party in the multi-tenant system, and wherein the second party is different than the first party;
    generate a satisfiability clause comprising a Boolean constraint indicating configuration settings that prevent peek attacks between the first and second parties in the multi-tenant system;
    solve the satisfiability clause to generate a corresponding promise-not-to-peek configuration in accordance with the configuration settings of the Boolean constraint;
    determine whether a bit stream associated with the first party violates the promise-not-to-peek configuration; and
    in response to determining that the bit stream does not violate the promise-not-to-peek configuration, sign the bit stream before the bit stream is loaded onto the integrated circuit.

2. The article of manufacture of claim 1, wherein the instructions, when executed by the one or more processors, cause the one or more processors to further simplify the satisfiability clause.

3. The article of manufacture of claim 1, wherein the instructions, when executed by the one or more processors, cause the one or more processors to use a Boolean equation solver to solve the satisfiability clause.

4. The article of manufacture of claim 3, wherein the instructions, when executed by the one or more processors, cause the one or more processors to selectively remove bit settings associated with the first party from the solution to generate the promise-not-to-peek configuration when solving the satisfiability clause.

5. The article of manufacture of claim 3, wherein the instructions, when executed by the one or more processors, cause the one or more processors to generate an additional solution with fewer settings than the solution to prevent exposing the functionality of the first party.

6. The article of manufacture of claim 1, wherein the circuit design is a design of a routing multiplexer, and wherein the constraints of the satisfiability clause correspond to settings associated with different inputs of the routing multiplexer.

7. The article of manufacture of claim 1, wherein the promise-not-to-peek configuration comprises an exclusion configuration.

8. The article of manufacture of claim 1, wherein the instructions, when executed by the one or more processors, cause the one or more processors to:
    load a base configuration onto the integrated circuit to configure a static region on the integrated circuit and to configure partial reconfiguration regions corresponding to respective multiple personas of the first portion of the circuit design and the second portion of the circuit design;
    extract an exclusion region configuration corresponding to the promise-not-to-peek configuration; and
    apply the exclusion region configuration to the integrated circuit to remove malicious attacks created by the base configuration.

9. The article of manufacture of claim 8, wherein the instructions, when executed by the one or more processors, cause the one or more processors to:
    allow partial reconfiguration operations associated with new personas to occur only after applying the exclusion region configuration to the integrated circuit.

10. The article of manufacture of claim 8, wherein the instructions, when executed by the one or more processors, cause the one or more processors to:
allow a partial reconfiguration operation associated with a new persona to occur only after checking a private persona configuration of the new persona against the exclusion region configuration.

11. A method of operating a multi-tenant system on an integrated circuit, comprising:
loading a base configuration onto programmable logic device circuitry of the integrated circuit to configure a static region on the integrated circuit and to configure partial reconfiguration regions corresponding to multiple personas associated with different respective parties of a multi-tenant system;
extracting an exclusion region configuration; and
applying the exclusion region configuration to the programmable logic device circuitry of the integrated circuit to remove malicious attacks from a first party of the multi-tenant system on a second party of the multi-tenant system created by the base configuration, wherein the second party is different than the first party.

12. The method of claim 11, wherein extracting the exclusion region configuration comprises statically extracting the exclusion region configuration in the presence of non-shared configuration bits controlling a multiplexer of the programmable logic device circuitry of the the integrated circuit.

13. The method of claim 11, wherein extracting the exclusion region configuration comprises dynamically extracting the exclusion region configuration in the presence of shared or non-shared configuration bits controlling a multiplexer of the programmable logic device circuitry of the the integrated circuit.

14. The method of claim 11 comprising allowing partial reconfiguration operations associated with new personas to occur only after applying the exclusion region configuration to the programmable logic device circuitry of the integrated circuit.

15. The method of claim 11, comprising allowing a partial reconfiguration operation associated with a new persona to occur only after checking a private persona configuration of the new persona against the exclusion region configuration.

16. The method of claim 11, comprising:
obtaining the base configuration for the programmable logic device circuitry of the integrated circuit, wherein a first portion of the base configuration is associated with the first party in the multi-tenant system, wherein a second portion of the base configuration is associated with the second party in the multi-tenant system;
generating a satisfiability clause having constraints that prevent peek attacks between the first and second parties in the multi-tenant system;
solving the satisfiability clause to generate a corresponding promise-not-to-peek configuration;
determining whether a bit stream associated with the first party violates the promise-not-to-peek configuration;
in response to determining that the bit stream does not violate the promise-not-to-peek configuration, signing the bit stream.

17. A system comprising:
an integrated circuit comprising field programmable gate array (FPGA) programmable logic circuitry;
memory comprising instructions; and
one or more processors to execute the instructions, wherein the instructions, when executed, cause the one or more processors to:
obtain a system design for the programmable logic circuitry of the integrated circuit, wherein a first portion of the system design is associated with a first party in a multi-tenant system, wherein a second portion of the system design is associated with a second party in the multi-tenant system, and wherein the second party is different than the first party; and
confirm that a bit stream associated with the first portion of the system design would not cause a peek or poke attack on the second portion of the system design.

18. The system of claim 17, wherein the instructions, when executed, cause the one or more processors to:
generate a satisfiability clause having constraints that prevent peek attacks between the first and second parties in the multi-tenant system;
solve the satisfiability clause to generate a promise-not-to-peek configuration; and
use the promise-not-to-peek configuration to confirm that the bit stream associated with the first party does not peek on the second portion of the system design.

19. The system of claim 18, wherein the instructions, when executed, cause the one or more processors to:
load a base configuration onto the integrated circuit to configure a static region on the integrated circuit and to configure partial reconfiguration regions corresponding to respective multiple personas of the first portion of the system design and the second portion of the system design;
extract an exclusion region configuration corresponding to the promise-not-to-peek configuration; and
apply the exclusion region configuration to the integrated circuit to remove malicious attacks created by the base configuration.

20. The system of claim 19, wherein the instructions, when executed, cause the one or more processors to:
load a base configuration onto the integrated circuit to configure a static region on the integrated circuit and to configure partial reconfiguration regions corresponding to respective multiple personas of the first portion of the system design and the second portion of the system design;
extract an exclusion region configuration corresponding to the promise-not-to-peek configuration; and
apply the exclusion region configuration to the integrated circuit to remove malicious attacks created by the base configuration.

* * * * *